(12) United States Patent
Hosseini et al.

(10) Patent No.: US 12,489,566 B2
(45) Date of Patent: Dec. 2, 2025

(54) ADDITIONAL DETAILS ON REPORTING HARQ-ACK

(71) Applicant: QUALCOMM Incorporated, San Diego, CA (US)

(72) Inventors: Seyedkianoush Hosseini, San Diego, CA (US); Mostafa Khoshnevisan, San Diego, CA (US); Yi Huang, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 17/450,278

(22) Filed: Oct. 7, 2021

(65) Prior Publication Data

US 2022/0116153 A1  Apr. 14, 2022

Related U.S. Application Data

(60) Provisional application No. 63/089,498, filed on Oct. 8, 2020.

(51) Int. Cl.
*H04L 1/1812* (2023.01)
*H04L 5/00* (2006.01)
(Continued)

(52) U.S. Cl.
CPC .......... *H04L 1/1819* (2013.01); *H04L 5/0053* (2013.01); *H04W 72/0446* (2013.01);
(Continued)

(58) Field of Classification Search
CPC ..... H04L 1/1819; H04L 5/0053; H04L 5/001; H04L 1/1864; H04L 5/0055;
(Continued)

(56) References Cited

U.S. PATENT DOCUMENTS 11,750,336 B2   9/2023  Sun et al.
2013/0201917 A1*  8/2013  Damnjanovic ..... H04W 52/143
                                             370/328
(Continued)

FOREIGN PATENT DOCUMENTS

WO   2020029189 A1   2/2020

OTHER PUBLICATIONS

LG Electronics: "HARQ Procedure for NR-U," 3GPP Draft, 3GPP TSG RAN WG1 #98bis, R1-1910821 NR-U HARQ Final, 3rd Generation Partnership Project (3GPP), Oct. 14, 2019-Oct. 20, 2019, 8 October 019 (Oct. 8, 2019), XP051809211, 22 pages, (Year : 2019).*

(Continued)

*Primary Examiner* — Thinh D Tran
(74) *Attorney, Agent, or Firm* — Arent Fox, LLP

(57) ABSTRACT

Aspects are provided which allow a UE to defer HARQ-ACK reporting in PUCCH transmissions according to a configured HARQ-ACK codebook. In one aspect, the UE receives, from a base station, information triggering feedback for DL HARQ processes of the UE, the UE receives a RRC message configuring the feedback to be for less than all of the DL HARQ processes, and the UE reports the feedback based on the information and the RRC message. In another aspect, the UE reports feedback including a plurality of HARQ-ACK bits in a PUCCH, where each of the HARQ-ACK bits is associated with DL data, and at least one of the DL data is associated with a cancelled PUCCH transmission. The UE may also append to the feedback a HARQ-ACK bit associated with other DL data, where the other data is associated with another cancelled PUCCH transmission.

28 Claims, 19 Drawing Sheets

(51) Int. Cl.
*H04W 72/0446* (2023.01)
*H04W 72/1263* (2023.01)
*H04W 72/23* (2023.01)
*H04W 72/566* (2023.01)

(52) U.S. Cl.
CPC ....... *H04W 72/1263* (2013.01); *H04W 72/23* (2023.01); *H04W 72/566* (2023.01)

(58) Field of Classification Search
CPC ... H04L 5/0091; H04L 1/1822; H04L 1/1685; H04W 72/0446; H04W 72/1263; H04W 72/23; H04W 72/566
See application file for complete search history.

(56) References Cited

U.S. PATENT DOCUMENTS

| | | | | |
|---|---|---|---|---|
| 2018/0098345 | A1* | 4/2018 | Tiirola | H04L 5/0098 |
| 2019/0222394 | A1* | 7/2019 | Medles | H04L 5/0055 |
| 2021/0050950 | A1* | 2/2021 | Zhou | H04L 1/1812 |
| 2021/0242977 | A1* | 8/2021 | Khoshnevisan | H04W 76/11 |
| 2022/0094483 | A1* | 3/2022 | Hosseini | H04L 1/1861 |
| 2022/0353021 | A1* | 11/2022 | Park | H04L 5/0055 |
| 2023/0057476 | A1* | 2/2023 | Li | H04L 1/1864 |
| 2023/0141338 | A1* | 5/2023 | Lin | H04L 1/1822 370/329 |
| 2023/0188301 | A1* | 6/2023 | Ma | H04L 1/1887 370/329 |
| 2023/0239077 | A1* | 7/2023 | Gerami | H04W 72/1273 370/329 |
| 2023/0299891 | A1* | 9/2023 | Kittichokechai | H04L 1/1896 370/336 |
| 2023/0300816 | A1* | 9/2023 | Guo | H04L 1/1822 370/329 |
| 2023/0370209 | A1* | 11/2023 | Wang | H04L 5/14 |

OTHER PUBLICATIONS

Gerami et al., "Semi-Static HARQ Codebook for DL-SPS", U.S. Appl. No. 63/011,943, filed Apr. 17, 2020 (Year: 2020).*
Khoshnevisan et al., "Type 3 Hybrid Automatic Repeat Request Acknowledgement", U.S. Appl. No. 62/970,069, filed Feb. 4, 2020 (Year: 2020).*
Hosseini et al., "Codebook Generation for SPS with Delayed HARQ", U.S. Appl. No. 63/080,632, filed Sep. 18, 2020 (Year: 2020).*
International Search Report and Written Opinion from corresponding PCT Application No. PCT/US2021/054202.
LG Electronics: "HARQ Procedure for NR-U," 3GPP Draft, 3GPP TSG RAN WG1 #98bis, R1-1910821 NR-U HARQ Final, 3rd Generation Partnership Project (3GPP), Mobile Competence Centre, 650, Route Des Lucioles, F-06921, Sophia-Antipolis Cedex, France, vol. RAN WG1, No. Chongqing, China; Oct. 14, 2019-Oct. 20, 2019, Oct. 8, 2019 (Oct. 8, 2019), XP051809211, 22 pages, Retrieved from the Internet: URL: https://ftp.3gpp.org/tsg_ran/WG1_RL1/TSGR1_98b/Docs/R1-1910821.zipR1-1910821 NR-U HARQ_Final.doc [retrieved on Oct. 8, 2019], the whole document.
OPPO: "HARQ Enhancements for NR-U", 3GPP Draft, 3GPP TSG RAN WG1 #98bis, R1-1910792, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019 Oct. 8, 2019 (Oct. 8, 2019), XP051809198, 8 Pages, Retrieved from the Internet: URL: https://ftp.3gpp.org/tsg_ran/WG1_RL1/TSGR1_98b/Docs/R1-1910792.zipR1-1910792.docx [retrieved on Oct. 8, 2019] the whole document.
Partial International Search Report—PCT/US2021/054202—ISA/EPO—Feb. 8, 2022.

* cited by examiner

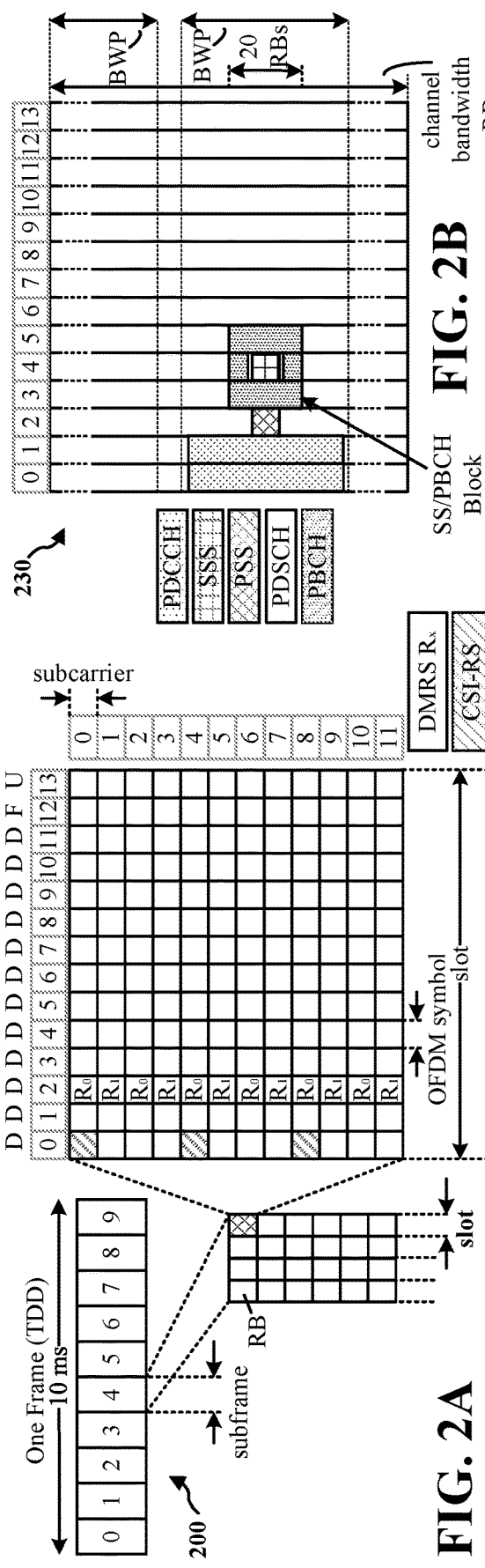
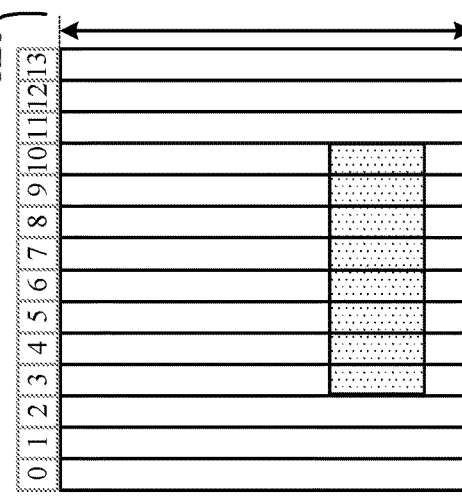
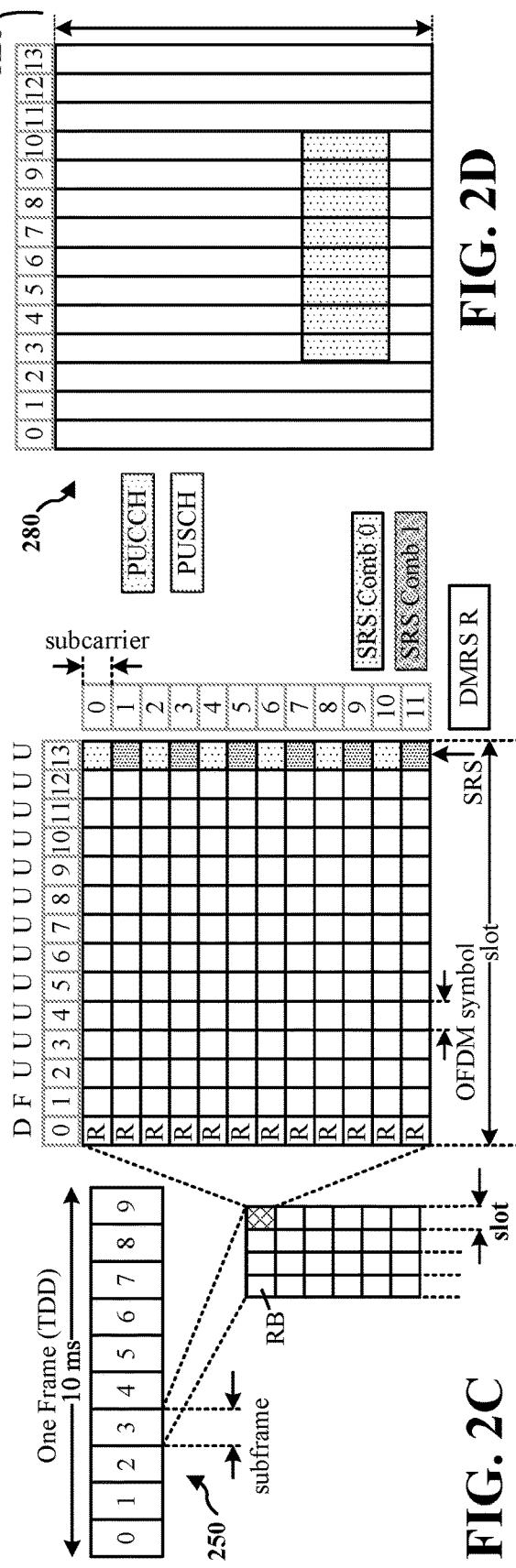
FIG. 2A
FIG. 2B
FIG. 2C
FIG. 2D

ADDITIONAL DETAILS ON REPORTING HARQ-ACK

CROSS REFERENCE TO RELATED APPLICATION(S)

This application claims the benefit of U.S. Provisional Application Ser. No. 63/089,498, entitled "ADDITIONAL DETAILS ON REPORTING HARQ-ACK FOR DOWNLINK SEMI-PERSISTENT SCHEDULING" and filed on Oct. 8, 2020, the disclosure of which is expressly incorporated by reference herein in its entirety.

BACKGROUND

Technical Field

The present disclosure generally relates to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The apparatus receives, from a base station, information triggering feedback for a plurality of downlink (DL) hybrid automatic repeat request (HARQ) processes of the UE. The apparatus receives, from the base station, a radio resource control (RRC) message configuring the feedback to be for less than all of the DL HARQ processes. The apparatus reports the feedback based at least in part on the information and the RRC message.

In an aspect of the disclosure, a method, a computer-readable medium, and an apparatus are provided. The apparatus may be a UE. The apparatus reports feedback including a plurality of HARQ-acknowledgment (ACK) (HARQ-ACK) bits in a physical uplink control channel (PUCCH), where each of the HARQ-ACK bits is associated with DL data, and each of the DL data is associated with a cancelled PUCCH transmission.

In an aspect of the disclosure, a method, a computer-readable medium, and an apparatus are provided. The apparatus may be a base station. The apparatus transmits, to a UE, information triggering feedback for a plurality of DL HARQ processes of the UE. The apparatus transmits, to the UE, a RRC message configuring the feedback to be for less than all of the DL HARQ processes. The apparatus receives the feedback based at least in part on the information and the RRC message.

In an aspect of the disclosure, a method, a computer-readable medium, and an apparatus are provided. The apparatus may be a base station. The apparatus receives feedback including a plurality of HARQ-ACK bits in a PUCCH, where each of the HARQ-ACK bits is associated with DL data, and each of the DL data is associated with a cancelled PUCCH transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
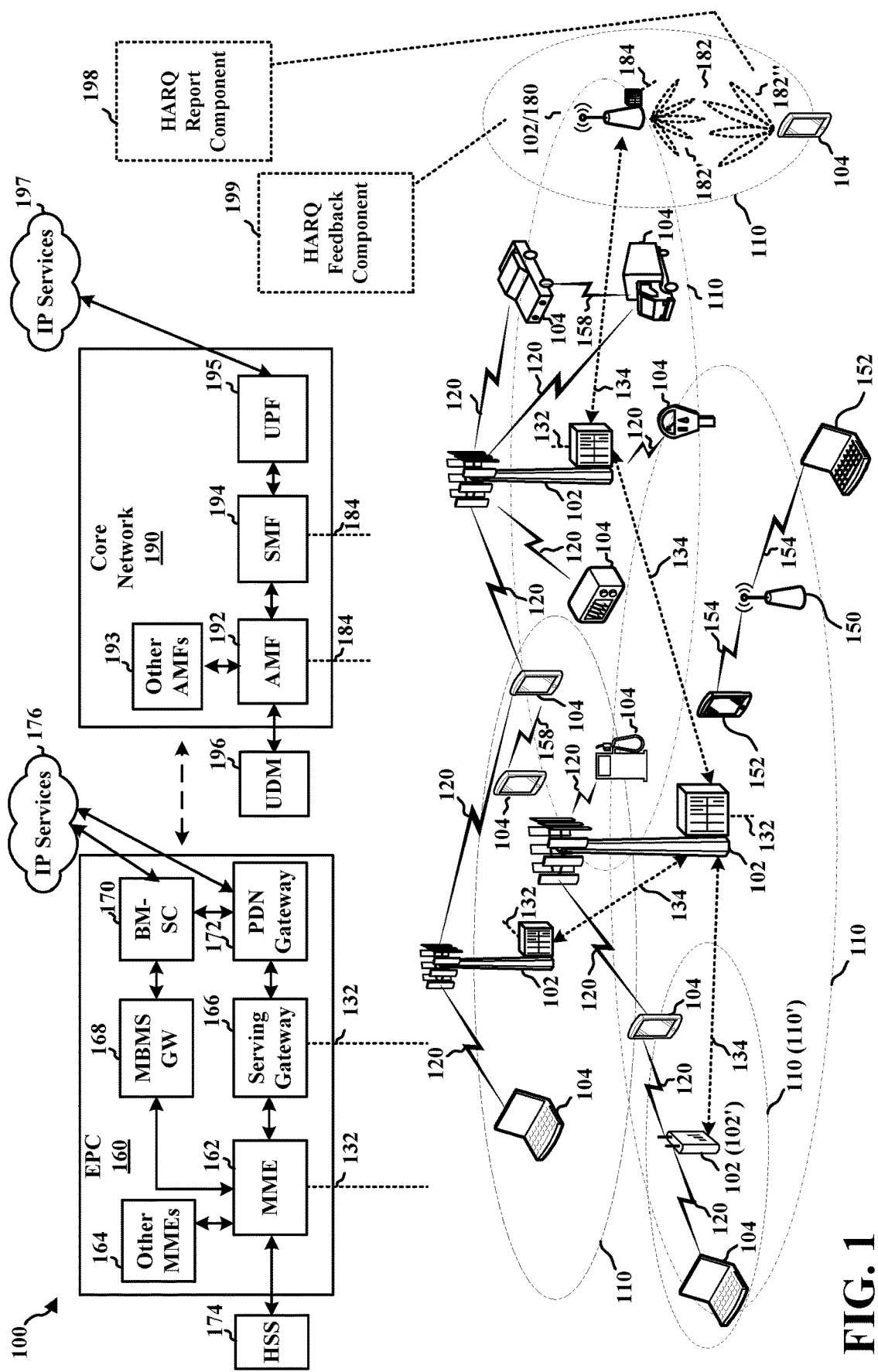
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A base station may schedule DL data to the UE on PDSCH dynamically or semi-persistently. In dynamic scheduling, each time the base station schedules DL data on PDSCH (e.g. dynamic DL data), the base station provides a DCI that includes a resource assignment for that PDSCH. The base station may change the resource assignment in DCI every time new dynamic DL data on a PDSCH is scheduled. In contrast, in semi-persistent scheduling (SPS), the base station provides the UE an RRC message (e.g. an SPS configuration) including a configured resource assignment for scheduled DL data on PDSCH that persists over a period of time (e.g. SPS DL data). The base station may also provide a DCI that activates the pre-configured resources for SPS. After the UE receives the SPS configuration, the base station may send SPS DL data on PDSCH in the pre-configured resources (e.g. at SPS PDSCH occasions), without sending a DCI dynamically configuring a new resource assignment for every PDSCH. Thus, the base station may send dynamic DL data or SPS DL data to the UE.

The base station may configure the UE with one SPS configuration or multiple SPS configurations. For instance, the base station may provide different SPS configurations including different resources for the UE to receive SPS DL data. For each SPS configuration, the base station may also provide a timeline (e.g. a set of slot timing values K1) for the UE to report HARQ-ACK/NACK feedback in response to the received SPS DL data. For example, if the base station sends a DCI activating an SPS configuration, the base station may provide a set of slot timing values K1 for that SPS configuration in the DCI based on the DCI format. Alternatively, the base station may provide the set of slot timing values K1 in an RRC message (e.g. by an RRC parameter named dl-DataToUL-ACK or another name).

In a given SPS configuration, the base station may assign a PUCCH resource associated with SPS PDSCH occasions, and the UE may provide HARQ-ACK/NACK feedback using the PUCCH resource. For example, when the base station provides a DCI to the UE activating configured resources in an SPS configuration, the base station may also provide a PUCCH resource indicator (PRI) in the DCI from which the UE may determine the PUCCH resource for HARQ-ACK/NACK feedback. The PRI may indicate the PUCCH resource for a first PDSCH following the DCI. In another example, the base station may provide an RRC parameter to the UE (e.g. a parameter SPS-PUCCH-A/N or another name) from which the UE may determine the PUCCH resource. This RRC parameter may also indicate the PUCCH resource for other PDSCH occasions subsequent to the first PDSCH following a DCI.

However, in some cases, a configured SPS PDSCH occasion, a timeline K1, or a configured PRI may point to an invalid resource for PUCCH transmissions. For example, in certain time division duplexing (TDD) deployments, a PUCCH resource may be scheduled to occur, based on the SPS configuration and timeline K1, in a semi-statically configured downlink slot. A similar situation may occur if a PUCCH resource is scheduled to occur, based on K1 or PRI, in semi-statically configured downlink symbols (e.g. where a PUCCH resource happens to be scheduled in uplink and downlink symbols of a slot or multiple slots). Since the UE cannot transmit the scheduled HARQ-ACK/NACK on PUCCH in that downlink slot (or downlink symbols), the UE generally cancels the PUCCH transmission.

Thus, the UE typically drops a HARQ-ACK transmission when a PUCCH resource associated with SPS PDSCH collides with an invalid symbol or slot. However, this approach may be costly in TDD bands where the UE retransmits dropped HARQ-ACK/NACK associated with many (i.e. all) SPS PDSCHs. Therefore, rather than cancelling the transmission, the UE may instead delay or defer the PUCCH transmission to a next valid PUCCH resource, such as in a following uplink slot. Aspects are presented which allow the UE to generate a HARQ-ACK codebook for SPS to achieve this effect, including based on a Type-3 HARQ-ACK codebook or based on a Type-1 HARQ-ACK codebook.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a HARQ report component 198 that is configured to receive, from a base station, information triggering feedback for a plurality of DL HARQ processes of the UE, and to receive, from the base station, a RRC message configuring the feedback to be for less than all of the DL HARQ processes. The HARQ report component 198 is also configured to report the feedback based at least in part on the information and the RRC message.

In other aspects, the HARQ report component 198 is configured to report feedback including a plurality of HARQ-ACK bits in a PUCCH, where each of the HARQ-ACK bits is associated with DL data, and each of the DL data is associated with a cancelled PUCCH transmission.

Referring again to FIG. 1, in certain aspects, the base station 180 may include a HARQ feedback component 199 that is configured to transmit, to a UE, information triggering feedback for a plurality of DL HARQ processes of the UE, and to transmit, to the UE, an RRC message configuring the feedback to be for less than all of the DL HARQ processes. The HARQ feedback component 199 is also configured to receive the feedback based at least in part on the information and the RRC message.

In other aspects, the HARQ feedback component 199 is configured to receive feedback including a plurality of HARQ-ACK bits in a PUCCH, where each of the HARQ-ACK bits is associated with DL data, and each of the DL data is associated with a cancelled PUCCH transmission.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu 0$ to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
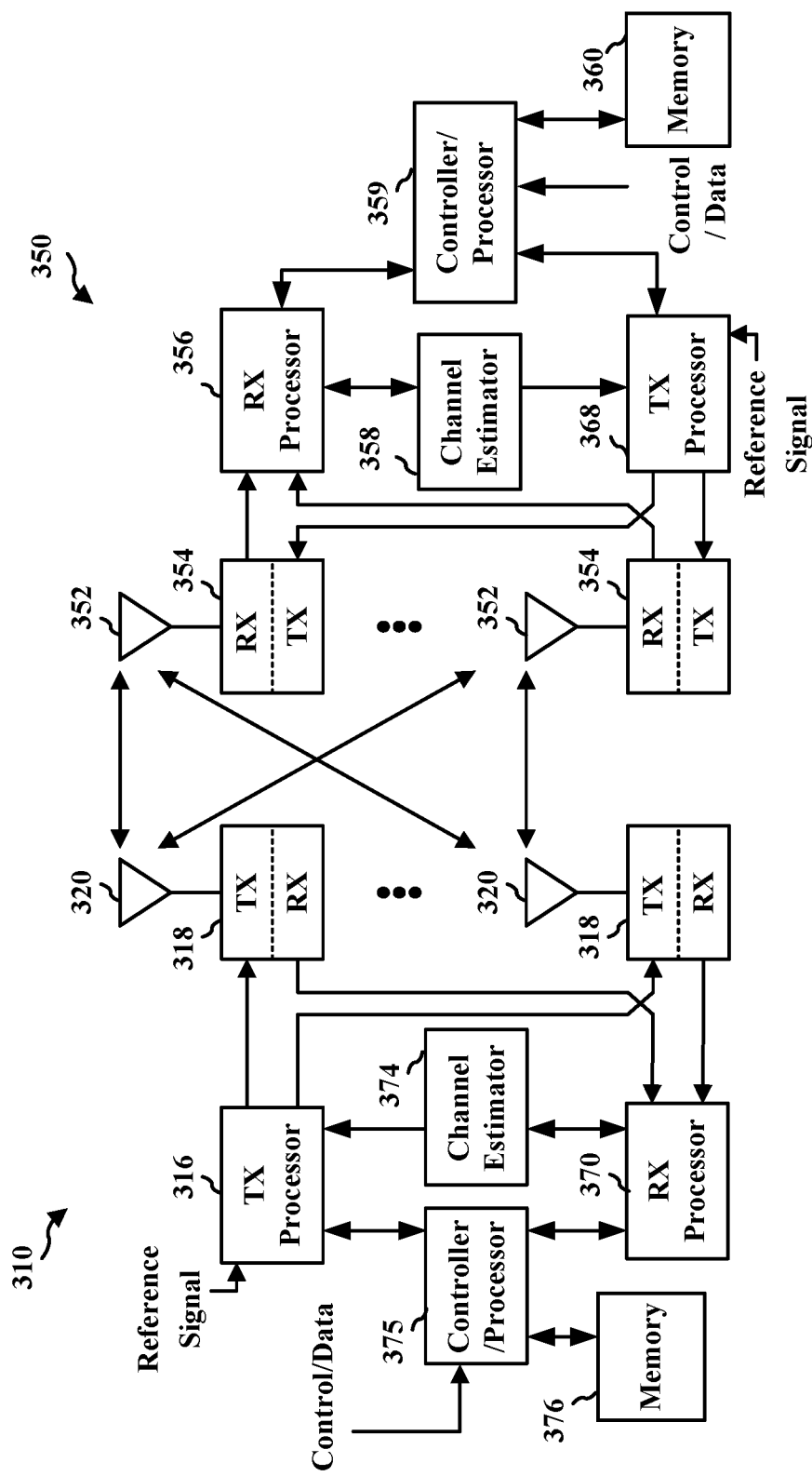
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with HARQ report component 198 of FIG. 1.

At least one of the TX processor 316, the RX processor 370, and the controller/processor 375 may be configured to perform aspects in connection with HARQ feedback component 199 of FIG. 1.

A base station may schedule DL data to the UE on PDSCH dynamically or semi-persistently. In dynamic scheduling, each time the base station schedules DL data on PDSCH (e.g. dynamic DL data), the base station provides a DCI that includes a resource assignment for that PDSCH. The base station may change the resource assignment in DCI every time new dynamic DL data on a PDSCH is scheduled. In contrast, in SPS, the base station provides the UE an RRC message (e.g. an SPS configuration) including a configured resource assignment for scheduled DL data on PDSCH that persists over a period of time (e.g. SPS DL data). The base station may also provide a DCI that activates the pre-configured resources for SPS. After the UE receives the SPS configuration, the base station may send SPS DL data on PDSCH in the pre-configured resources (e.g. at SPS PDSCH occasions), without sending a DCI dynamically configuring a new resource assignment for every PDSCH. Thus, the base station may send dynamic DL data or SPS DL data to the UE.

The base station may configure the UE with one SPS configuration or multiple SPS configurations. For instance, the base station may provide different SPS configurations including different resources for the UE to receive SPS DL data. For each SPS configuration, the base station may also provide a timeline (e.g. a set of slot timing values K1) for the UE to report HARQ-ACK/NACK feedback in response to the received SPS DL data. For example, if the base station sends a DCI activating an SPS configuration, the base station may provide a set of slot timing values K1 for that SPS configuration in the DCI based on the DCI format. Alternatively, the base station may provide the set of slot timing values K1 in an RRC message (e.g. by an RRC parameter named dl-DataToUL-ACK or another name).

In a given SPS configuration, the base station may assign a PUCCH resource associated with SPS PDSCH occasions, and the UE may provide HARQ-ACK/NACK feedback using the PUCCH resource. For example, when the base station provides a DCI to the UE activating configured resources in an SPS configuration, the base station may also provide a PRI in the DCI from which the UE may determine the PUCCH resource for HARQ-ACK/NACK feedback. The PRI may indicate the PUCCH resource for a first PDSCH following the DCI. In another example, the base station may provide an RRC parameter to the UE (e.g. a parameter SPS-PUCCH-A/N or another name) from which the UE may determine the PUCCH resource. This RRC parameter may also indicate the PUCCH resource for other PDSCH occasions subsequent to the first PDSCH following a DCI.

Figure 4:
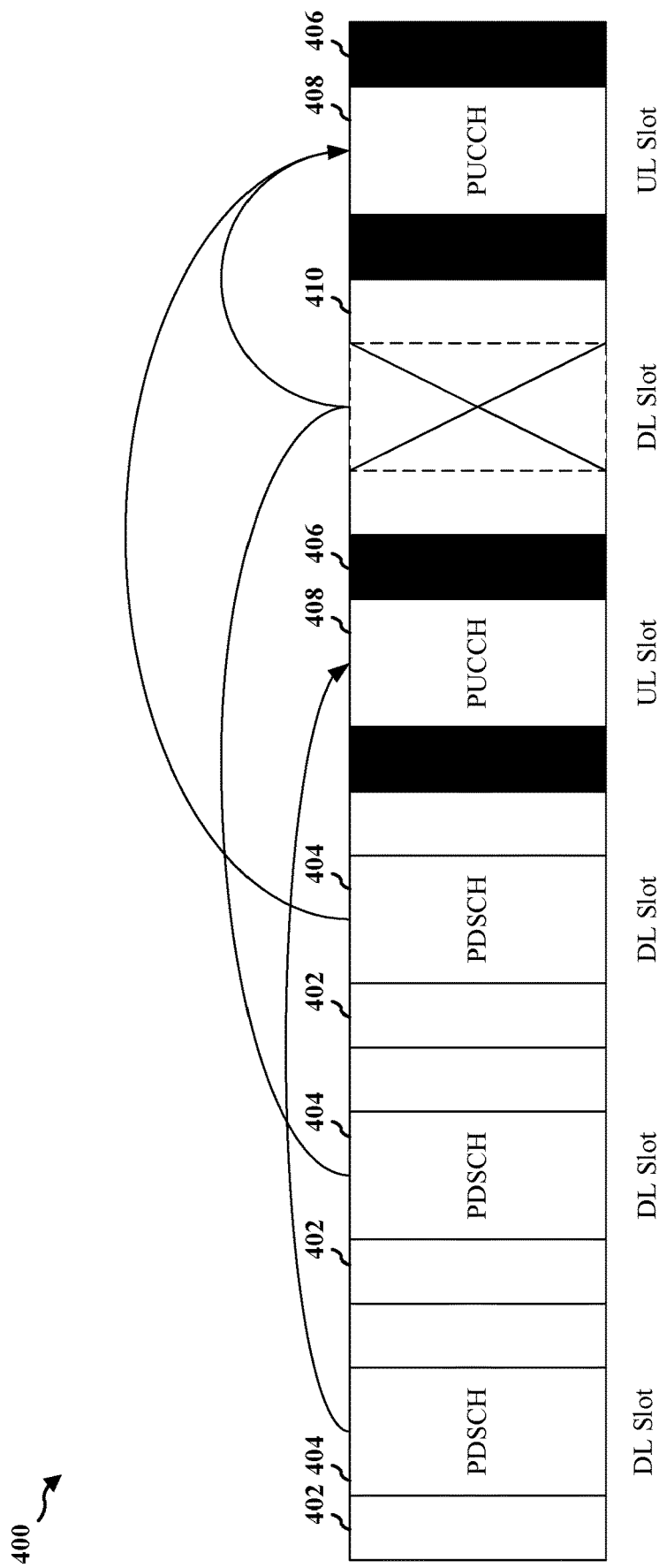
FIG. 4 is a diagram illustrating an example of downlink slots including SPS DL data on a physical downlink shared channel (PDSCH) and uplink slots including HARQ-ACK/non-acknowledgment (NACK) feedback on PUCCH resources.

However, in some cases, a configured SPS PDSCH occasion, a timeline K1, or a configured PRI may point to an invalid resource for PUCCH transmissions. FIG. 4 illustrates an example 400 of downlink slots 402 including SPS DL data on PDSCH (e.g. SPS PDSCH 404) and uplink slots 406 including HARQ-ACK/NACK feedback on PUCCH resources 408 associated with the SPS PDSCH. In this example, the base station has provided the UE an SPS configuration having a periodicity of one slot and a timeline K1 of 3 slots. In other words, the base station transmits SPS DL data every slot and the UE sends corresponding HARQ-ACK/NACK feedback three slots after receiving each corresponding SPS PDSCH, as illustrated by the arced arrows in FIG. 4. In other examples, the base station may configure different periodicities and K1 timelines, and the UE may receive SPS PDSCH and transmit HARQ-ACK/NACK accordingly. However, in certain TDD deployments, at least one of the PUCCH resources 408 may be scheduled to occur, based on the SPS configuration and timeline K1, in a semi-statically configured downlink slot such as downlink slot 410 in FIG. 4. A similar situation may occur if a PUCCH resource is scheduled to occur, based on K1 or PRI, in semi-statically configured downlink symbols (e.g. where a PUCCH resource happens to be scheduled in uplink and downlink symbols of a slot or multiple slots). Since the UE cannot transmit the scheduled HARQ-ACK/NACK on PUCCH in that downlink slot 410 (or downlink symbols), the UE generally cancels the PUCCH transmission.

Thus, the UE typically drops a HARQ-ACK transmission when a PUCCH resource associated with SPS PDSCH collides with an invalid symbol or slot. However, this approach may be costly in TDD bands where the UE retransmits dropped HARQ-ACK/NACK associated with many (i.e. all) SPS PDSCHs. Therefore, rather than cancelling the transmission, the UE may instead delay or defer the PUCCH transmission to a next valid PUCCH resource, such as in the latest uplink slot 406 illustrated in FIG. 4. Aspects are presented which allow the UE to generate a HARQ-ACK codebook for SPS to achieve this effect, including a Type-3 HARQ-ACK codebook and a Type-1 HARQ-ACK codebook.

With respect to Type-3 HARQ-ACK codebooks, the base station may provide a DCI to the UE configuring one shot HARQ-ACK reporting support (e.g. in a parameter pdsch-HARQ-ACK-OneShotFeedback or another name). The DCI may trigger the UE to determine a Type-3 HARQ-ACK codebook, for which the UE generates HARQ-ACK/NACK for all HARQ processes of all downlink component carriers configured for the UE. The UE then reports all of the generated HARQ-ACK/NACK in the PUCCH resource indicated by the base station associated with SPS DL data.

Figure 5:
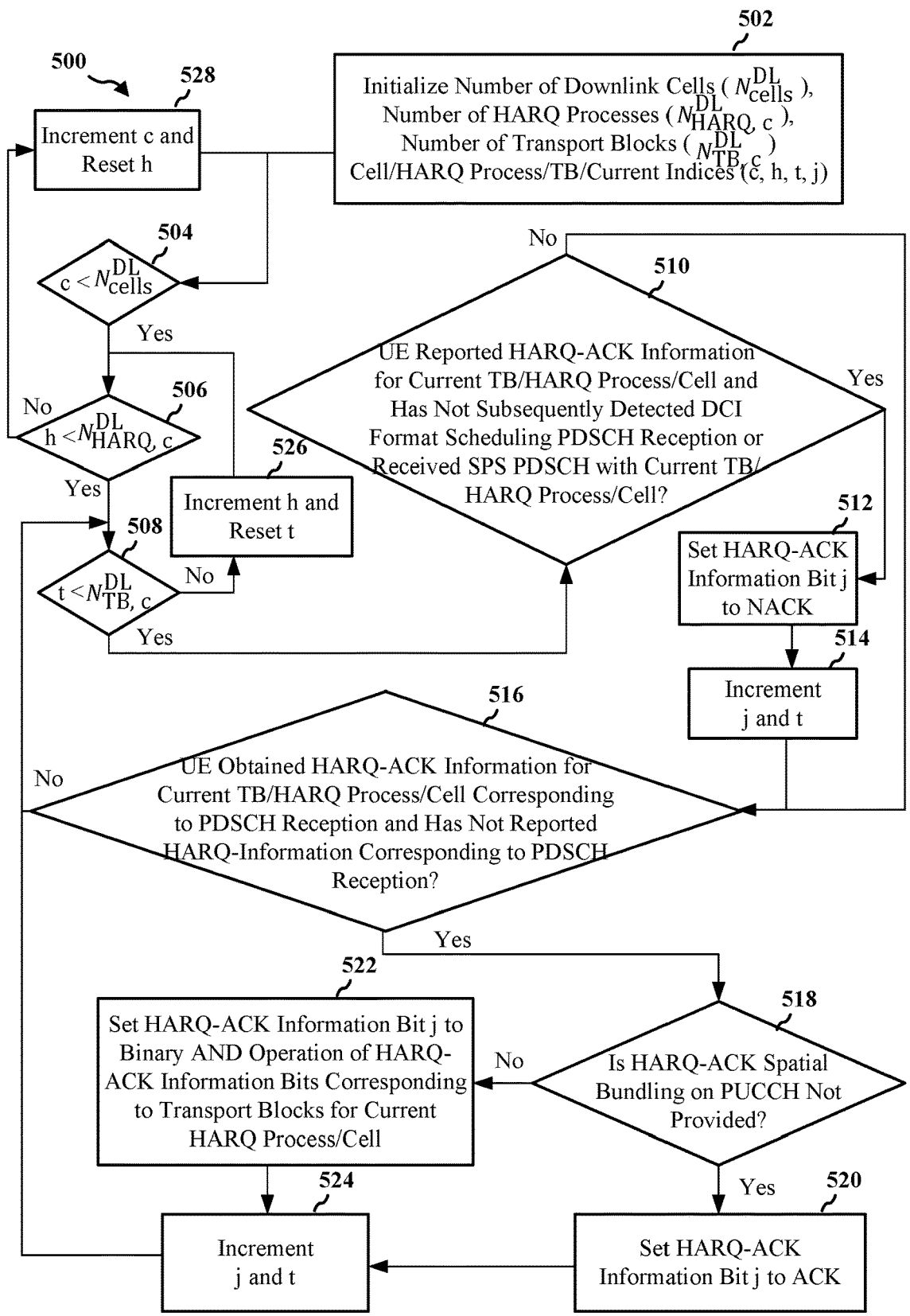
FIG. 5 is a flowchart depicting an example process of Type-3 HARQ-ACK codebook generation at the UE.

FIG. 5 illustrates a flowchart 500 depicting an example process of Type-3 HARQ-ACK codebook generation at the UE. First, at 502, the UE initializes a number of downlink cells ($N_{cells}^{DL}$), a number of HARQ processes ($N_{HARQ,c}^{DL}$), a number of transport blocks ($N_{TB,c}^{DL}$), and various indices (c, h, t, and j) respectively corresponding to a current cell, a current HARQ process, a current transport block or a current HARQ-ACK bit in the codebook. For example, the UE may (1) set $N_{cells}^{DL}$ to the number of configured serving cells; (2) set $N_{HARQ,c}^{DL}$ to the value of nrofHARQ-Processes-ForPDSCH for serving cell c, if provided; else, set $N_{HARQ,c}^{DL}=8$; (3) set $N_{TB,c}^{DL}$ to the value of maxNrofCode-WordsScheduledByDCI for serving cell c if harq-ACK-SpatialBundlingPUCCH is provided and $NDI_{HARQ}=0$, or if harq-ACK-SpatialBundlingPUCCH is not provided, or if maxCodeBlockGroupsPerTransportBlock is provided for serving cell c; else, set $N_{TB,c}^{DL}=1$; (4) set c=0 (serving cell index); (5) set h=0 (HARQ process number); and (6) set t=0 (TB index).

Next, at 504 and 506, the UE respectively determines if $c<N_{cells}^{DL}$ and $h<N_{HARQ,c}^{DL}$ (i.e. the UE is still generating HARQ-ACK bits for cells and HARQ-ACK processes). If so, then at 508, the UE checks if $t<N_{TB,c}^{DL}$ (i.e. the UE is still generating HARQ-ACK bit(s) for transport blocks), in which case the UE determines at 510 whether the UE has reported HARQ-ACK information for TB t for HARQ process number h on serving cell c and has not subsequently detected a DCI format scheduling a PDSCH reception, or received a SPS PDSCH, with TB t for HARQ process number h on serving cell c. If the UE has previously reported HARQ-ACK information for the transport block without subsequently receiving a DCI scheduling a PDSCH (i.e. the UE has received a DCI triggering the Type-3 HARQ-ACK codebook without scheduling new DL data), then at 512, the UE sets the HARQ-ACK information bit j to NACK, and at 514, the UE increments j and t to move on to generating the next HARQ-ACK information bit for the next transport block.

Moreover, at 516, the UE determines if the UE has obtained HARQ-ACK information for TB t for HARQ process number h on serving cell c corresponding to a PDSCH reception and has not reported the HARQ-ACK information corresponding to the PDSCH reception. If so, then at 518, the UE checks if harq-ACK-SpatialBundling-PUCCH is not provided, in which case at 520, the UE sets the HARQ-ACK information bit j for TB t for HARQ process h of serving cell c to ACK. Otherwise, at 522, the UE performs a binary AND operation of the HARQ-ACK information bits corresponding to first and second transport blocks for HARQ process h of serving cell c, and sets the HARQ-ACK information bit j accordingly. If the UE receives one transport block, the UE assumes ACK for the second transport block. Regardless of the determination at 518, subsequently at 524, the UE increments j and t to move on to generating the next HARQ-ACK information bit for the next transport block.

The UE continues to repeat the above process of generating HARQ-ACK so long as the UE determines at 508 that $t<N_{TB,c}^{DL}$. Once the UE finishes generating a HARQ-ACK bit associated with each transport block for a given cell and HARQ process, then at 526, the UE increments h, resets t, and re-repeats the aforementioned steps for the next HARQ process so long as the UE determines at 506 that $h<N_{HARQ,c}^{DL}$. Once the UE finishes generating HARQ-ACK bits associated with each HARQ process for a current cell or component carrier, then at 528, the UE increments c, resets h, and re-repeats the above process for the next cell or carrier so long as the UE determines at 504 that $c<N_{cells}^{DL}$. Once the UE finishes generating HARQ-ACK bits associated with each cell or component carrier, the process ends and the Type-3 HARQ-ACK codebook generation is complete.

The process illustrated and described above with respect to Type-3 HARQ-ACK codebook generation is merely an example. In other examples, the Type-3 HARQ-ACK codebook may be generated in other ways or based on other information. For instance, the UE may generate HARQ-ACK information bits further based on code block groups (CBG) and new data indicators (NDI).

As described above, the base station may transmit a DCI to the UE which includes a one-shot HARQ-ACK field triggering Type-3 HARQ-ACK codebook generation such as described with respect to FIG. 5. For example, the base station may set the one-shot HARQ-ACK field value to 1, in response to which the UE may report HARQ-ACK for all configured HARQ processes. However, while in some cases the DCI may schedule data on a PDSCH and then trigger the Type-3 HARQ reporting, in other cases the DCI may only trigger the reporting without scheduling any data.

Figure 6:
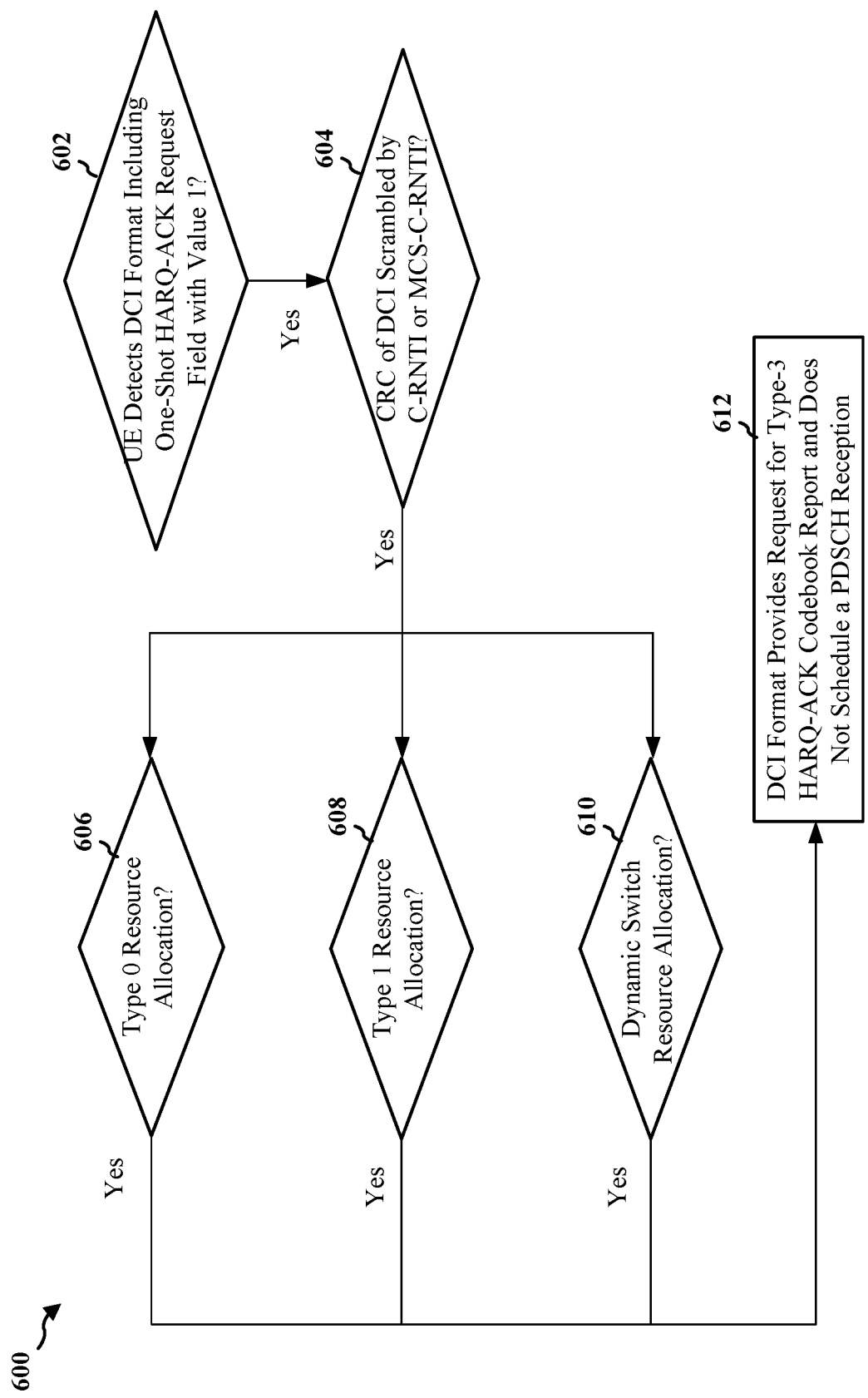
FIG. 6 is a flowchart depicting an example process which a UE may perform to determine whether a received downlink control information (DCI) only triggers Type-3 HARQ ACK reporting without scheduling data on a subsequent PDSCH.

FIG. 6 illustrates a flowchart 600 depicting an example process which a UE may perform to determine whether a received DCI only triggers Type-3 HARQ ACK reporting without scheduling data on a subsequent PDSCH. First, at 602, the UE checks if the DCI format includes a One-shot HARQ-ACK request field with value 1, and at 604, the UE determines if a cyclic redundancy check (CRC) of the DCI is scrambled by a cell radio network temporary identifier (C-RNTI) of the UE or a modulation coding scheme C-RNTI (MCS-C-RNTI) of the UE. If both determinations are positive, then at 606, 608, and 610, the UE respectively determines whether the resource allocation in the DCI meets one of the following conditions: (1) resourceAllocation=resourceAllocationType0 and all bits of the frequency domain resource assignment field in the DCI format are equal to 0 (as determined at 606); resourceAllocation=resourceAllocationType1 and all bits of the frequency domain resource assignment field in the DCI format are equal to 1 (as determined at 608); or resourceAllocation=dynamicSwitch and all bits of the frequency domain resource assignment field in the DCI format are equal to 0 or 1 (as determined at 610). If one of these conditions is satisfied, then at 612, the UE determines that the DCI format provides a request for a Type-3 HARQ-ACK codebook report and does not schedule a PDSCH reception. In such case, the UE may provide HARQ-ACK information in response to the request for the Type-3 HARQ-ACK codebook after N symbols from the last symbol of a PDCCH providing the DCI format, where N=5 for µ=0, N=5.5 for µ=1, and N=11 for µ=2 if processingType2Enabled of PDSCH-ServingCellConfig is set to enable for the serving cell with the PDCCH providing the DCI format, or otherwise where N=10 for µ=0, N=12 for µ=1, and N=22 for µ=2, and where µ corresponds to the smallest SCS configuration between the SCS configuration of the PDCCH providing the DCI format and the SCS configuration of a PUCCH carrying the HARQ-ACK information in response to a DCI format.

Thus, the UE may report HARQ-ACK/NACK for DL data based on a Type-3 HARQ codebook in response to a DCI that triggers the HARQ-ACK reporting and that may or may not schedule a PDSCH as described above. However, such HARQ-ACK reporting for all configured HARQ processes and does not differentiate between dynamic DL data and SPS DL data. Thus, when the UE generates a Type-3 HARQ codebook associated with PDSCH occasions carrying DL data generally, the UE ends up reporting HARQ-ACK/NACK for both dynamic DL data and SPS DL data (or all HARQ processes) without being able to select which type of data (or which HARQ processes) to include in the reporting. As a result, the HARQ payload reported by the UE may be larger than desired.

To configure the UE to report only HARQ-ACK for SPS DL data (or other subset of all configured HARQ processes) and thus reduce the HARQ payload, the base station may include an additional bit or a pre-defined setting for one or more information fields in the DCI from which the UE may determine to filter the codebook generation and reporting. For example, if the base station configures the UE with an SPS configuration including assigned resources for SPS DL data and sends a DCI to the UE activating the assigned resources and indicating for the UE to perform one shot HARQ reporting as described above with respect to FIG. 5, the base station may include an additional bit in the DCI which indicates to the UE whether to report HARQ-ACK for both dynamic DL data and SPS DL data, or whether to only report HARQ-ACK for SPS DL data. Alternatively, the base station may configure an information field in the DCI with a pre-defined setting, such as an MCS field with a bit pattern of all 0's or some other field or bit pattern, to indicate to the UE whether to report HARQ-ACK for both dynamic DL data and SPS DL data, or whether to only report HARQ-ACK for SPS DL data. For example, if the DCI indicates the UE to only report HARQ-ACK for SPS DL data based on a configured bit or information field setting, the UE may generate the Type 3-HARQ-ACK codebook based on a modification of the process described above with respect to FIG. 5. For instance, referring to FIG. 5, the UE may further determine whether a current HARQ process h is associated with a PDSCH scheduled by a DCI format including a resource allocation for dynamic DL data, in which case the UE may skip generating HARQ-ACK information bits for that HARQ process h. Thus, less than all HARQ processes (the non-skipped processes) may be included in the generation of HARQ-ACK information bits in response to the DCI, reducing the HARQ payload. The UE may also determine from such DCI whether the DCI only triggers the UE to only report HARQ-ACK for SPS DL data or whether the DCI also schedules a SPS PDSCH reception, as described above with respect to FIG. 6.

Alternatively, the UE may report HARQ-ACK as described above with respect to FIG. 5 for all HARQ processes (e.g. for dynamic DL data and SPS DL data), or only for SPS DL data (or other subset of HARQ processes), based on a configuration other than an additional bit or information field setting in DCI. For example, the UE may receive an RRC message or be otherwise configured by the base station outside of DCI to report Type-3 HARQ-ACK codebooks triggered by DCI for only SPS DL data. Thus, the RRC message may configure the UE to report Type-3 HARQ-ACK codebooks for less than all HARQ processes (e.g., only SPS DL data), reducing the HARQ payload. When the UE later receives a DCI triggering the Type-3 HARQ report, the UE may determine from the DCI whether the DCI only triggers the UE to only report HARQ-ACK for SPS DL data or whether the DCI also schedules a SPS PDSCH reception, as described above with respect to FIG. 6.

Moreover, the base station may configure the UE to report only HARQ-ACK bits for those SPS PDSCH occasions and associated HARQ processes which have canceled PUCCH transmissions (such as described above with respect to FIG. 4), to even further reduce the HARQ payload. For example, the base station may similarly include another bit or another pre-defined setting for one or more additional information fields in the DCI from which the UE may similarly determine to further filter the codebook generation and reporting. For example, if the base station sends a DCI to the UE indicating for the UE to perform one shot HARQ reporting as described above with respect to FIG. 5 with SPS DL data only (and not dynamic DL data), the base station may explicitly include an additional bit or another information field setting in the DCI which indicates to the UE whether to report HARQ-ACK/NACK for all SPS HARQ processes, or only for cancelled HARQ-ACK/NACKs (e.g. cancelled based on SPS configurations, K1 timelines, or PRI configurations which schedule the PUCCH in a downlink slot or symbol in TDD). Alternatively, the base station may implicitly configure the UE to generate the Type-3 HARQ-ACK codebook only with such cancelled HARQ-ACK/NACKs based on whether the UE is configured to monitor a slot format indication (SFI) or whether the UE is configured with uplink transmission priority. For example, if the UE does not monitor SFI (e.g. the UE does not check if a flexible slot has been changed to downlink and thus does not drop uplink transmissions in that slot) or if the UE does not consider uplink transmission priority (e.g. the UE does not drop low priority transmissions in favor of high priority transmissions), there may be less likelihood of misalignment between the UE and base station regarding which SPS PUCCHs may be dropped, and thus it may be practical for the base station to configure the UE to generate the codebook only for the dropped HARQ-ACK/NACK processes. In either case (explicit or implicit indication), the UE may generate the Type 3-HARQ-ACK codebook based on a similar modification of the process described above with respect to FIG. 5.

Figure 7:
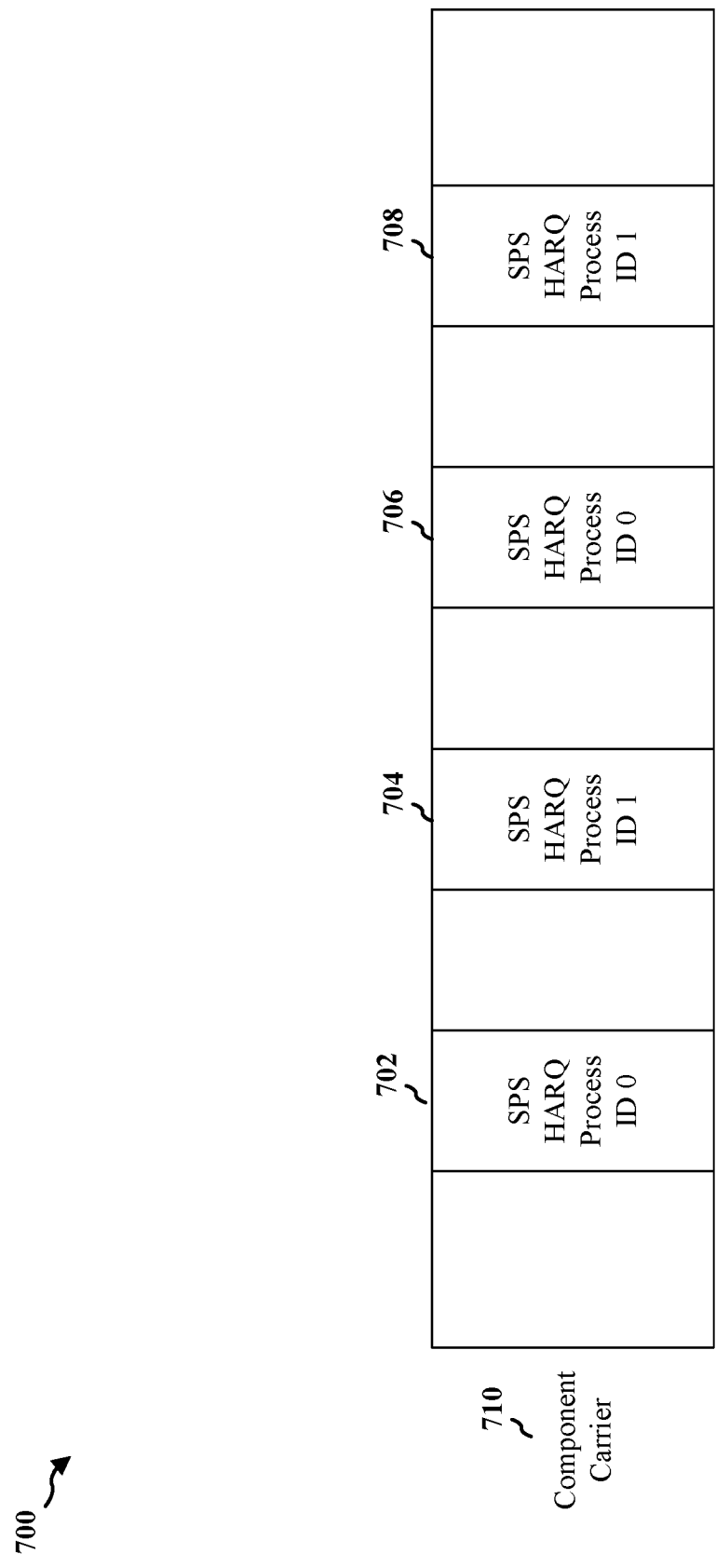
FIG. 7 is an example of downlink slots including SPS PDSCH occasions associated with HARQ process identifiers (IDs) that repeat over time in a particular HARQ process pattern for a given component carrier and SPS configuration.

Furthermore, each of these SPS PDSCH occasions may be associated with a HARQ process ID which the base station assigns to repeat over time. For instance, FIG. 7 illustrates an example 700 of downlink slots including SPS PDSCH occasions 702, 704, 706, 708 associated with HARQ process IDs that repeat over time in a particular HARQ process pattern for a given component carrier 710 and SPS configuration. In such example, when the UE reports HARQ-ACK/NACK associated with SPS DL data in a Type-3 HARQ codebook, the UE may report HARQ-ACK associated with HARQ Process 0 for the first SPS PDSCH occasion 702 in a first scheduled PUCCH, HARQ-ACK associated with HARQ Process 1 for the second SPS PDSCH occasion 704 in a second scheduled PUCCH, new HARQ-ACK associated with HARQ Process 0 again but for the third SPS PDSCH occasion 706 in a third scheduled PUCCH, and new HARQ-ACK associated with HARQ Process 1 again but for the fourth SPS PDSCH occasion 708 in a fourth scheduled PUCCH. In other examples, the base station may configure SPS PDSCH occasions to be associated with other HARQ Process IDs that repeat in other patterns based on other SPS configurations.

As described above, the UE may cancel a HARQ-ACK associated with a given HARQ process (e.g. if the SPS configuration, K1 timeline, or PRI configurations happens to schedule the PUCCH in a downlink slot or symbol in TDD). In such case, when HARQ process repetition is configured such as illustrated in FIG. 7, the UE may still defer the cancelled HARQ-ACK by reporting it in a Type-3 codebook according to the process described above with respect to FIG. 5, assuming that the UE receives DCI triggering the codebook reporting prior to the next SPS PDSCH occasion associated with the same, dropped HARQ process. The DCI may indicate whether to report both dynamic DL data and SPS DL data or whether to only report HARQ-ACK for SPS DL data, as well as whether to report for all SPS HARQ processes, or only for cancelled HARQ-ACK/NACKs as described above. For example, if the UE cancels HARQ-ACK associated with HARQ Process 0 for the first SPS PDSCH occasion 702 in the first scheduled PUCCH and subsequently receives a DCI triggering Type 3 codebook reporting in the second scheduled PUCCH for all SPS HARQ processes only, the UE may generate the codebook with both HARQ processes 0 and 1 as previously described.

However, if the base station does not trigger Type-3 HARQ codebook reporting prior to another SPS PDSCH occasion associated with the same HARQ process, a HARQ process conflict may occur. For example, if the UE cancels HARQ-ACK associated with HARQ Process 0 for the first SPS PDSCH occasion 702 in the first scheduled PUCCH as described above, but in this example later receives a DCI triggering Type 3 codebook reporting in the third scheduled PUCCH (which occurs after the third SPS PDSCH occasion 706 also associated with HARQ Process 0), a conflict may arise regarding which HARQ Process 0 the UE may include when generating the Type 3-HARQ codebook: the new HARQ process 0 associated with the third SPS PDSCH occasion 706 or the old, dropped HARQ Process 0 associated with the first SPS PDSCH occasion 702. To address this conflict, the UE may drop the old HARQ Process 0 from the Type 3-HARQ codebook generation, and replace it with the one associated with the new SPS PDSCH occasion. For instance, when reporting HARQ-ACK feedback in the third scheduled PUCCH, the UE may generate the HARQ-ACK/NACK bits for the Type 3 codebook with HARQ process 0 associated with the third SPS PDSCH occasion 706 and HARQ process 1 associated with the second SPS PDSCH occasion 704, while ignoring or dropping HARQ process 0 associated with the first SPS PDSCH occasion 702.

Additionally, when the UE generates HARQ-ACK/NACK bits in the Type-3 codebook in response to a DCI indicating to report HARQ-ACK only for SPS DL data and for all SPS HARQ processes (regardless of whether the base station configures HARQ process repetition or not), the UE may place the bits in the HARQ payload or codebook in various orders. In one example, the order may be in order of HARQ processes followed by carriers, such as described above with respect to FIG. 5. For instance, once the UE finishes generating a HARQ-ACK bit associated with each transport block for a given cell and HARQ process, the UE may initially repeat the bit generation for the next HARQ process while $h<N_{HARQ,c}^{DL}$, and after the UE finishes generating HARQ-ACK bits associated with each HARQ process for a current component carrier, the UE may re-repeat the bit generation for the next carrier while $c<N_{cells}^{DL}$. In another example, the order may be in order of SPS configuration index, HARQ processes, then carriers. For instance, if the base station configures the UE with multiple SPS configurations, the UE may first generate a HARQ-ACK bit associated with each SPS configuration for a given cell, HARQ process, and transport block, and then follow the other steps described above with respect to FIG. 5 including repeating the bit generation for each transport block while $t<N_{TB,c}^{DL}$, followed by each HARQ process while $h<N_{HARQ,c}^{DL}$, followed by each carrier while $c<N_{cells}^{DL}$. Alternatively, the SPS configuration index may be factored into the Type-3 codebook generation with the HARQ processes and carriers in other orders.

Moreover, when the UE generates HARQ-ACK/NACK bits in the Type-3 codebook in response to a DCI indicating to report HARQ-ACK only for SPS DL data and only for cancelled HARQ-ACK/NACKs, the UE may place the bits in the HARQ payload or codebook similarly in the various orders described above (e.g. in order of HARQ processes followed by carriers, as well as based on SPS configuration index). Alternatively, rather than generating the HARQ-ACK/NACK feedback for only cancelled HARQ-ACK/NACKs in order of HARQ process, the UE may generate the feedback based on the order of SPS DL data reception or PDSCH occasion in the time domain. As an example, the SPS DL data associated with cancelled PUCCH transmissions may be received chronologically in order of HARQ process 3, HARQ process 0, and HARQ process 1. That is, a first SPS PDSCH occasion received in time may be associated with HARQ process 3, a second SPS PDSCH occasion next received in time may be associated with HARQ process 0, and a third SPS PDSCH occasion subsequently received in time may be associated with HARQ process 1. In such case, rather than generating the feedback in order of HARQ process (i.e. second SPS PDSCH occasion for HARQ process 0, third SPS PDSCH occasion for HARQ process 1, and first SPS PDSCH occasion for HARQ process 3), the UE may generate the feedback in order of SPS PDSCH occasion. Thus, referring to FIG. 5, rather than generating HARQ-ACK/NACK bits for each HARQ process in order of h while $h<N_{HARQ,c}^{DL}$, the UE may instead generate HARQ-ACK/NACK bits in order of PDSCH reception. Thus, for each component carrier in this example, the HARQ-ACK information bit for HARQ process 3 may be set first, followed by the HARQ-ACK information bit for HARQ process 0, followed by the HARQ-ACK information bit for HARQ process 1.

Thus far, examples of HARQ-ACK feedback reporting for Type-3 HARQ codebooks have been described. Alternatively, the base station may configure the UE to perform HARQ-ACK feedback reporting according to Type-1 HARQ codebooks. Unlike Type-3 HARQ codebooks which may be dynamically triggered by an information field in DCI (e.g. pdsch-HARQ-ACK-OneShotFeedback or another name), Type-1 HARQ codebooks are semi-statically configured (e.g. via an RRC message). That is, unlike for Type-3 codebooks where the PUCCH resource in which the codebook is reported may dynamically change in DCI, the PUCCH resource in which Type-1 HARQ codebooks are reported may persist over a configured period of time. Each Type-1 HARQ codebook may include a fixed number of HARQ-ACK/NACK bits for each PUCCH transmission which are associated with one or more PDSCH occasions.

The UE may identify the PDSCH occasions per slot as a function of a time domain resource assignment (TDRA) for each PDSCH occasion. That is, each PDSCH occasion in a given slot may include various TDRA candidates (e.g. potential symbols) in which dynamic DL data or SPS DL data may be received.

Figure 8:
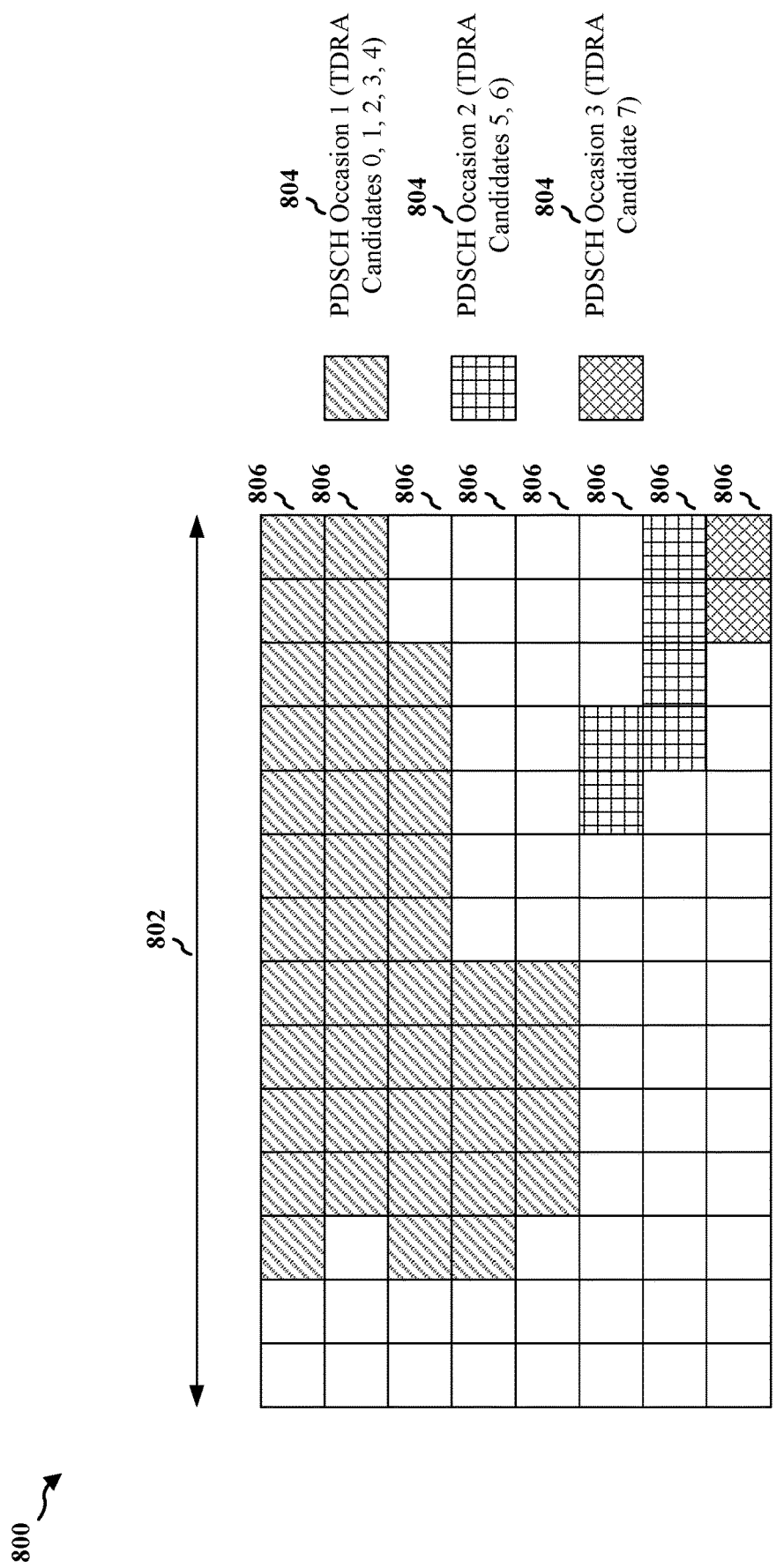
FIG. 8 is an example of a slot including multiple PDSCH occasions.

FIG. 8 illustrates an example 800 of a slot 802 including multiple PDSCH occasions 804. In this example, three PDSCH occasions are configured for slot 802, although more or less PDSCH occasions may be configured in other examples. Each PDSCH occasion 804 may include a number of TDRA candidates 806 indicating the potential symbols in which a particular PDSCH occasion may be received by the UE. The TDRA candidates 806 may be selected by the base station for each PDSCH occasion from various indexed rows in an allocation table. The allocation table may be pre-configured by the base station and define a slot offset $K_0$, a start and length indicator SLIV, or directly a start symbol S and allocation length L. The allocation table may also include other parameters such as a PDSCH mapping type and a DMRS position. Table 1 depicts an example of such allocation table, where five TDRA candidates for PDSCH Occasion 1 are selected from row indices 1 (S=2, L=12), 1 (S=3, L=11), 2 (S=2, L=10). 5 (S=2, L=5), and 5 (S=3, L=4), where two TDRA candidates for PDSCH Occasion 2 are selected from row indices 10 (5=9, L=2) and 6 (S=10, L=4), and where one TDRA candidate for PDSCH Occasion 3 is selected from row index 11 (S=12, L=2). In this example, the five TDRA candidates for PDSCH Occasion 1 are identified as TDRA candidates 0-4, the two TDRA Candidates for PDSCH Occasion 2 are identified as TDRA candidates 5 and 6, and the TDRA Candidate for PDSCH Occasion 3 is identified as TDRA candidate 7.

TABLE 1

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

The UE may identify a set of PDSCH occasions for previous slots whose HARQ-ACK/NACK may be mapped to a given PUCCH. The maximum length of a window including the previous slots may be equal to a maximum value in a set of slot timing values K1, or $K1_{max}$. For example, K1 may be provided by a set of slot timing values {1, 2, 3, 4, 5, 6, 7, 8}, or by a base station configured parameter such as dl-DataToUL-ACK or other name (which may include a set of any value(s) from 0 to 15, for example, with up to 8 values in the set), and $K1_{max}$ may be a maximum value in the configured set. As an example, referring to FIG. 8, after the UE identifies all three PDSCH occasions 804 in slot 802, the UE may similarly identify the PDSCH occasions in prior slots up to $K1_{max}$. For instance, if K1 includes the set of slot timing values {1, 2, 3, 4, 5, 6, 7, 8} such that 8 is the maximum K1, the UE may identify PDSCH occasions in eight total slots (from a latest slot n to an earliest slot n−7). The UE may then generate a HARQ-ACK information bit for each identified PDSCH occasion over the window of slots and report the Type-1 codebook including all of the HARQ-ACK information bits in the same PUCCH, regardless of whether the HARQ-ACK bits are associated with dynamic PDSCH occasions or SPS PDSCH occasions.

Figure 9:
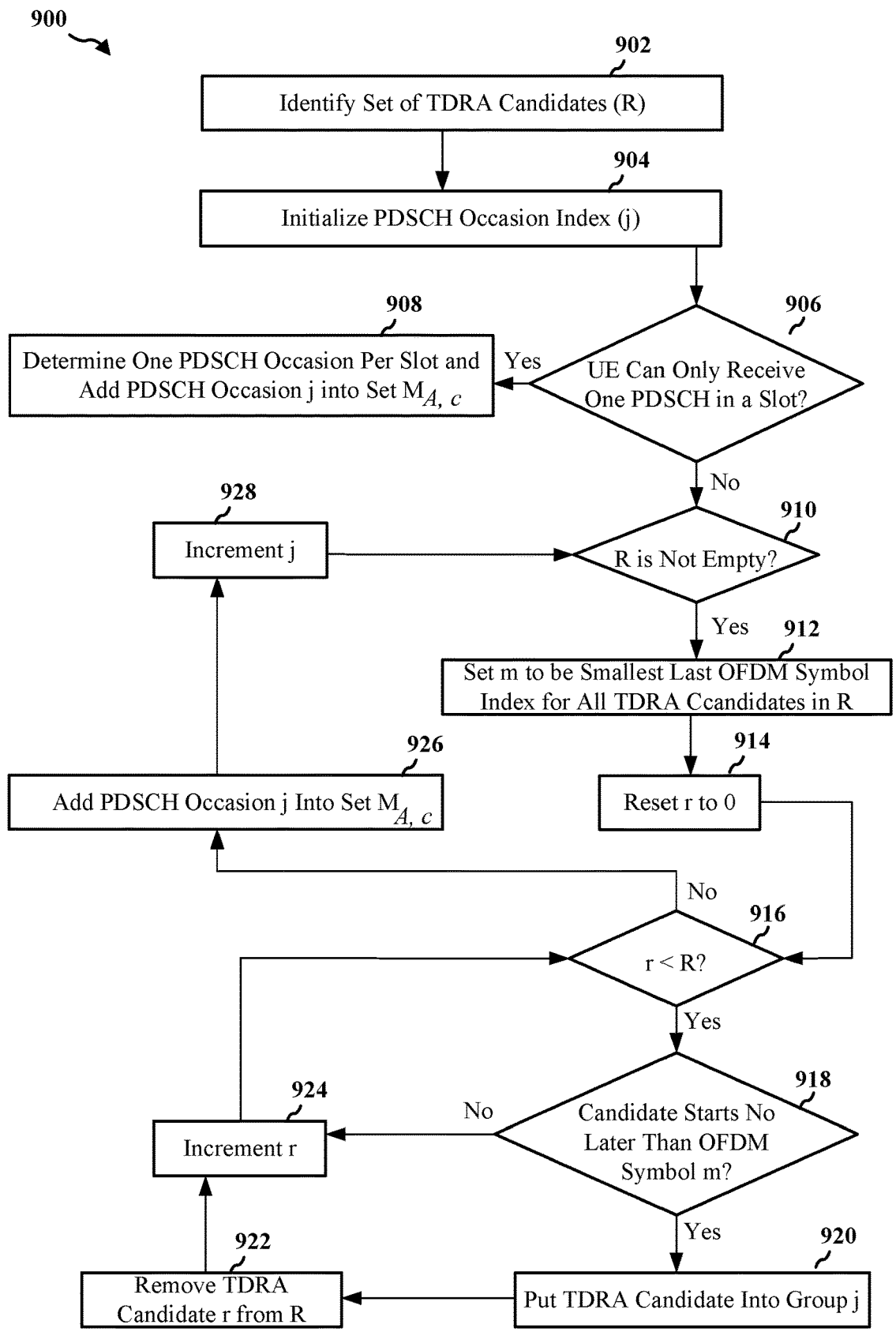
FIG. 9 is a flowchart depicting an example process where the UE identifies a set of PDSCH occasions for Type-1 HARQ-ACK codebook generation.

FIG. 9 illustrates a flowchart 900 depicting an example process where the UE identifies a set of PDSCH occasions for Type-1 HARQ-ACK codebook generation. First, at 902, the UE identifies a set of TDRA candidates (R). For example, referring to FIG. 8, the UE may identify a set of row indexes R from Table 1 corresponding to the TDRA candidates 806 which are associated with all of the PDSCH occasions 804 in slot 802 and in prior slots together within a window of slots spanning length $K1_{max}$. Then, at 904, the UE initializes a PDSCH occasion index (j), for example, by setting j=0. For each slot in the window of slots represented by $K1_{max}$, the UE determines at 906 whether the UE indicated a capability to receive more than one unicast PDSCH per slot. If so, then at 908, the UE determines that there is only one PDSCH occasion per slot, and the UE adds the current PDSCH occasion index j into a set of PDSCH occasions $M_{A,c}$. The UE may then increment j and repeat the determination at 906 for each slot in the window represented by $K1_{max}$. If at 906 the UE determines that multiple PDSCH occasions may be received in a slot (such as illustrated in slot 802 of FIG. 8), then at 910, the UE checks whether the set of TDRA candidates R is currently empty. If not, then at 912, 914, 916, and 918 respectively, the UE sets a value m to the smallest last OFDM symbol index among all rows of R, resets a value r corresponding to a current row in R to 0, checks whether r<R, and determines whether a start OFDM symbol index S for the current row r (i.e. the value S in Table 1 for the current TDRA candidate) is no later than the smallest last OFDM symbol index m. For instance, referring to FIG. 8, when the UE checks TDRA candidates in PDSCH occasion 1, the UE may set m to symbol 6 (since the $6^{th}$ symbol in slot 802 is the last symbol of TDRA candidate 4, which is the smallest length TDRA candidate), and check whether a current TDRA candidate's starting symbol is not later than symbol 6. If so (S<=m), then at 920, 922, and 924 respectively, the UE places the current TDRA candidate into a group associated with PDSCH occasion index j, removes the current TDRA candidate r from the set R, and increments r to the next row.

After incrementing r, the UE repeats the aforementioned process for each r, placing each TDRA candidate into the group associated with a current PDSCH occasion index j, until the UE determines at 916 that r is no longer less than R (i.e. all TDRA candidates have been considered in the current PDSCH occasion). In such case, at 926, the UE adds the PDSCH occasion j into the set of PDSCH occasions $M_{A,c}$. Afterwards, at 928, the UE increments j, and repeats the aforementioned process for the TDRA candidates in each PDSCH occasion j until the UE determines at 910 that R is no longer empty (i.e. all TDRA candidates for all PDSCH occasions in a current slot n have been considered). The UE then repeats the above process of adding TDRA candidates for each PDSCH occasion j into the set of PDSCH occasions $M_{A,c}$ for all of the other slots in the window represented by $K1_{max}$, including, for example, previous slot n−1, previous slot n−2, and so forth back to previous slot $n-K1_{max}-1$. After all the slots have been processed, the set of PDSCH occasions $M_{A,c}$ includes all the PDSCH occasions in the window, and the UE may proceed to set HARQ-ACK information bits according to the Type-1 codebook associated with each PDSCH occasion in the set.

Figure 10:
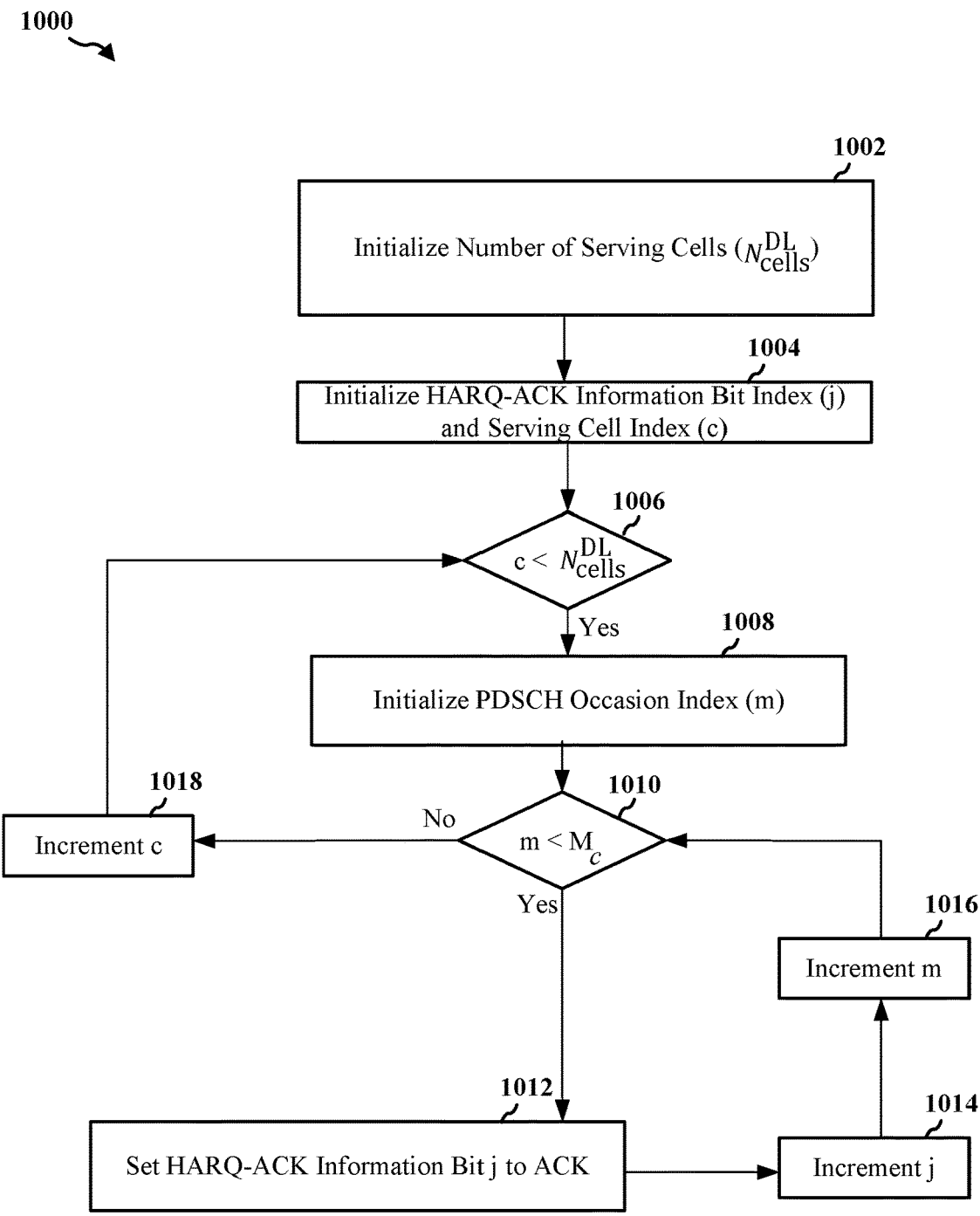
FIG. 10 is a flowchart depicting an example process of Type-1 HARQ-ACK codebook generation at the UE.

FIG. 10 illustrates a flowchart 1000 depicting an example process of Type-1 HARQ-ACK codebook generation at the UE. First, at 1002, the UE initializes a number of downlink cells ($N_{cells}^{DL}$). For example, the UE may set $N_{cells}^{DL}$ to the number of serving cells configured by higher layers for the UE. At 1004, the UE also initializes a HARQ-ACK information bit index j (e.g. j=0) and a serving cell index c (e.g. c=0), with lower serving cell indices corresponding to lower RRC indices of corresponding cells. Next, at 1006, the UE determines if $c<N_{cells}^{DL}$, in which case, at 1008, the UE initializes an index m corresponding to an index of an occasion for candidate PDSCH reception (e.g. a current PDSCH occasion index). The UE then determines at 1010 whether $m<M_c$, where $M_c$ is the total number of PDSCH occasions for serving cell c defined by the set of PDSCH occasions $M_{A,c}$ (identified, for example, according to the process of FIG. 9). If so, then at 1012, the UE sets a current HARQ-ACK information bit j to ACK for the current PDSCH occasion m, and at 1014 and 1016 respectively, the UE increments j to move to the next HARQ-ACK information bit and m to move to the next PDSCH occasion. The UE may then repeat the above process of setting HARQ-ACK information bits for each PDSCH occasion until the UE determines at 1010 that all PDSCH occasions have been processed (m is no longer $<M_c$), in which case at 1018, the UE increments c to move on to the next serving cell. The UE may then repeat the aforementioned process for each serving cell until the UE determines at 1006 that all cells have been processed (c is no longer $<N_{cells}^{DL}$) at which point the Type-1 HARQ codebook is fully generated and the process may end.

Figure 11:
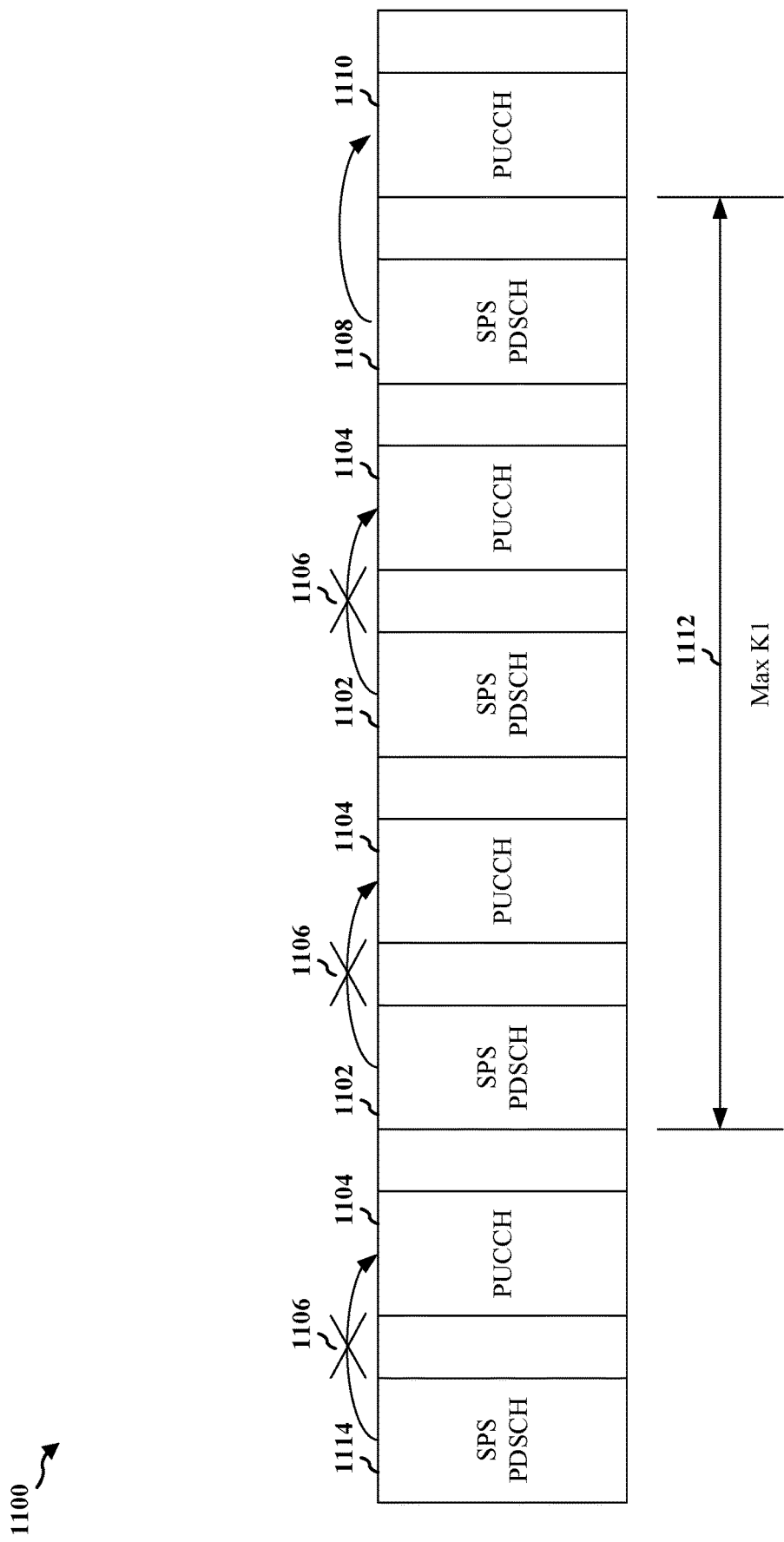
FIG. 11 is an example of SPS PDSCH occasions which are associated with PUCCH occasions, where the PUCCH occasions are associated with dropped HARQ-ACK transmissions.

In some cases, the PDSCH occasions associated with the Type-1 HARQ codebook may be SPS PDSCH occasions (and/or dynamically scheduled PDSCH occasions) associated with cancelled PUCCH transmissions. For instance, FIG. 11 illustrates an example 1100 of SPS PDSCH occasions 1102 which are associated with PUCCH occasions 1104 that happen to be scheduled in downlink slots or symbols as described above, and thus the UE drops HARQ-ACK transmissions in those PUCCH occasions (e.g. cancelled PUCCH transmissions 1106). Moreover, one of the SPS PDSCH occasions 1108 may be associated with a PUCCH occasion 1110 that is validly scheduled in an uplink slot or symbols. In such example, the base station may indicate to the UE (e.g. via an RRC message or DCI) to transmit HARQ-ACK bits for the SPS PDSCH occasions 1102 associated with cancelled PUCCH transmissions 1106 together on the same PUCCH occasion 1110 associated with SPS PDSCH occasion 1108, based on a Type-1 HARQ codebook. For instance, the UE may generate a Type-1 HARQ-ACK codebook including HARQ-ACK information bits corresponding to the SPS PDSCH occasions 1102 and 1108 within a window 1112 of slots spanning a length $K1_{max}$ as described above with respect to FIGS. 9 and 10. However, if any SPS PDSCH occasions are received outside the window 1112 of slots, such as SPS PDSCH occasion 1114, the HARQ-ACK/NACK associated with these SPS PDSCH occasions may be dropped and not re-transmitted. While the example of FIG. 11 specifically refers to SPS PDSCH occasions, in other examples the PDSCH occasions may be dynamically scheduled, or some of the PDSCH occasions may be dynamically scheduled while other PDSCH occasions may be SPS PDSCH occasions.

To prevent such dropping of HARQ-ACK/NACK, in one example, the UE may modify the process of FIGS. 9 and 10 to include SPS PDSCH occasions (and/or dynamically scheduled PDSCH occasions) outside the window of slots which are associated with cancelled PUCCH transmissions in the Type-1 HARQ-ACK codebook. For example, after the UE adds TDRA candidates for each PDSCH occasion j into the set of PDSCH occasions $M_{A,c}$ for all slots in the window represented by K1max as described above with respect to FIG. 9, the UE may repeat this process for SPS PDSCH occasions (and/or dynamically scheduled PDSCH occasions) in other previous slots outside the window which are associated with PUCCH occasions scheduled in downlink slots or symbols. For instance, when identifying the set of PDSCH occasions $M_{A,c}$, the UE may include SPS PDSCH occasion 1114 outside the window 1112 in the set along with SPS PDSCH occasions 1102, 1108. The UE may similarly include dynamically scheduled PDSCH occasions outside the window in the set along with other dynamically scheduled and/or SPS PDSCH occasions. The UE may then proceed to set HARQ-ACK information bits according to the Type-1 codebook associated with each PDSCH occasion in the set as described above with respect to FIG. 10.

Alternatively, in another example, the UE may not include such SPS PDSCH occasions outside the window 1112 (e.g. SPS PDSCH occasion 1114) (and/or dynamically scheduled PDSCH occasions outside the window) in the Type-1 HARQ codebook generation process of FIGS. 9 and 10, but instead may generate HARQ-ACK for such PDSCH occasions according to a different process and append the generated HARQ-ACK information bits to the Type-1 HARQ codebook. For instance, in the example of FIG. 11, the UE may generate and place HARQ-ACK bits corresponding to SPS PDSCH occasions 1102 (and/or dynamically scheduled PDSCH occasions) in a Type-1 HARQ codebook as described above with respect to FIGS. 9 and 10, but not HARQ-ACK bits corresponding to SPS PDSCH occasion 1114 or other PDSCH occasions outside window 1112. Instead, the UE may generate HARQ-ACK bits for those PDSCH occasions outside window 1112 according to an SPS configuration-based codebook (e.g., for SPS PDSCH occasions), such as described below with respect to FIG. 12, or according to some other codebook or manner (e.g., for SPS PDSCH occasions and/or dynamically scheduled PDSCH occasions). The UE may then append the HARQ-ACK bits for the outside SPS PDSCH occasions (and/or dynamically scheduled PDSCH occasions) to the Type-1 HARQ codebook. Moreover, as the size of window 1112 ($K1_{max}$) can flexibly be any set of configured value(s) (e.g., from 0 to 15 based on base station configured parameter dl-DataToUL-ACK), the UE may effectively append HARQ-bits for any of the configured PDSCH occasions to the Type-1 HARQ codebook.

In either example, the base station may trigger the UE to only report HARQ-ACK/NACK according to Type-1 HARQ codebooks only for SPS DL data and only for cancelled HARQ-ACK/NACKs, similar to that described above for Type-3 HARQ codebooks. For example, when the UE identifies PDSCH occasions as described above with respect to FIG. 9 and sets HARQ-ACK information bits according to the Type-1 codebook as described above with respect to FIG. 10, the UE may only consider PDSCH occasions 1114 and 1102, but not PDSCH occasion 1108, since PDSCH occasion 1108 is not associated with a cancelled PUCCH transmission.

Figure 12:
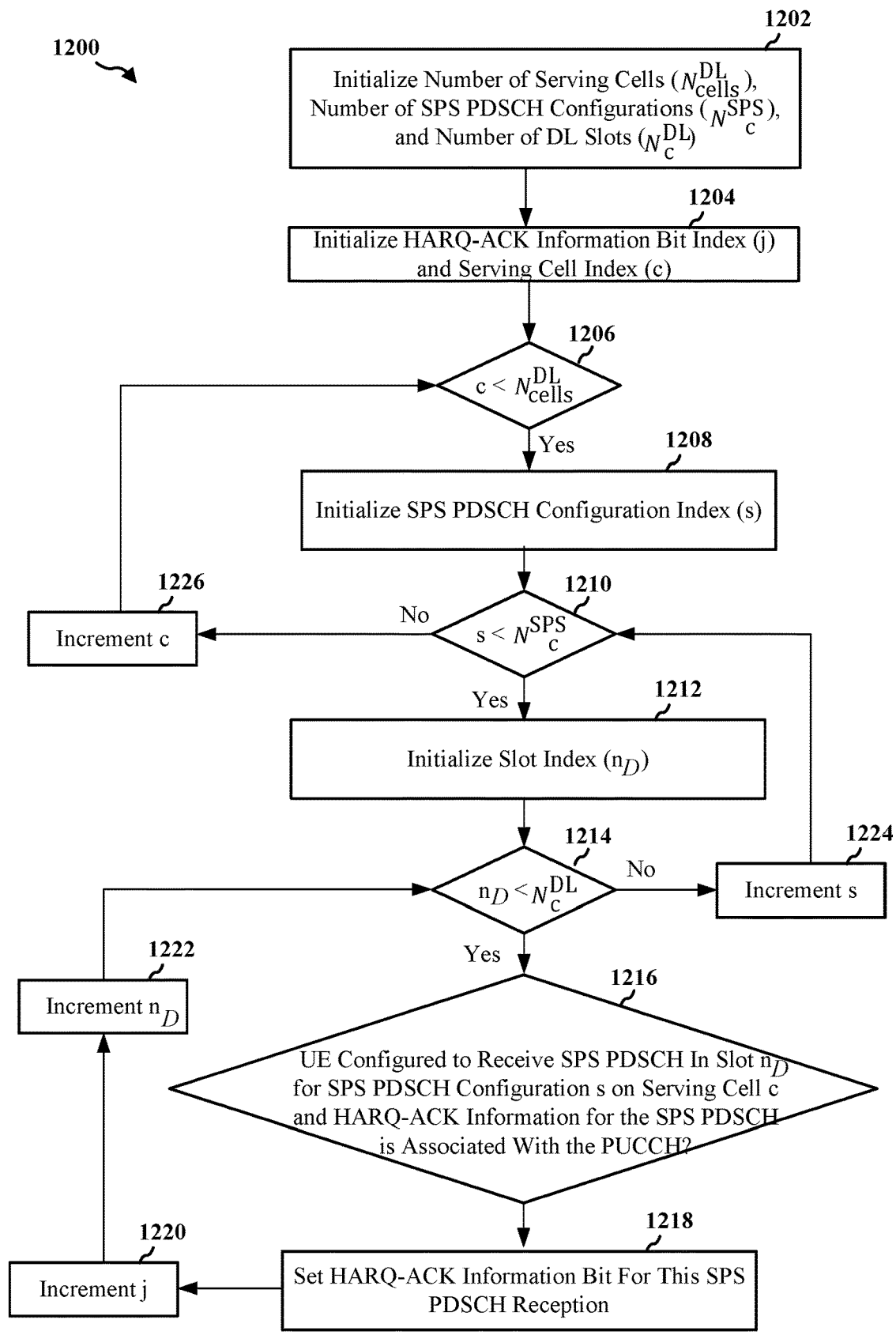
FIG. 12 is a flowchart depicting an example process of SPS configuration-based codebook generation at the UE.

FIG. 12 illustrates a flowchart 1200 depicting an example process of SPS configuration-based codebook generation at the UE. First, at 1202, the UE initializes a number of downlink cells ($N_{cells}^{DL}$), a number of SPS PDSCH configurations ($N_c^{SPS}$), and a number of downlink slots ($N_{cells}^{DL}$). For example, the UE may set $N_{cells}^{DL}$ to the number of serving cells configured to the UE, $N_c^{SPS}$ to the number of SPS PDSCH configurations configured to the UE for serving cell c, and $N_c^{DL}$ to the number of DL slots for SPS PDSCH reception on serving cell c with HARQ-ACK information multiplexed on the PUCCH. Moreover, at 1204, the UE initializes a HARQ-ACK information bit index j (e.g. j=0) and a serving cell index c (e.g. c=0), where lower serving cell indices correspond to lower RRC indices of a corresponding cell. Next, at 1206, the UE determines if $c<N_{cells}^{DL}$, in which case, at 1208, the UE initializes an index s corresponding to an SPS PDSCH configuration index, where lower indices correspond to lower RRC indices of corresponding SPS configurations. The UE then determines at 1210 whether $s<N_c^{SPS}$, in which case at 1212, the UE initializes a slot index $n_D$ (e.g. $n_D$=0).

At 1214, the UE checks whether $n_D<N_c^{DL}$, in which case at 1216, the UE determines whether the UE is configured to receive a SPS PDSCH in slot $n_D$ for SPS PDSCH configuration s on serving cell c, excluding SPS PDSCH that is not required to be received among overlapping SPS PDSCHs, or based on a UE capability for a number of PDSCH receptions in a slot, or due to overlapping with a set of symbols indicated as uplink by tdd-UL-DL-ConfigurationCommon or by tdd-UL-DL-ConfigurationDedicated, and whether HARQ-ACK information for the SPS PDSCH is associated with the PUCCH. If this condition is met, then at 1218, the UE sets the HARQ-ACK information bit j for the current SPS PDSCH reception to ACK, and at 1220 and 1222 respectively, the UE increments j and $n_D$. The UE may then repeat the above process of setting HARQ-ACK information bits j for each SPS PDSCH reception in a downlink slot until the UE determines at 1214 that $n_D$ is no longer less than $N_c^{DL}$ (e.g. all downlink slots for the current SPS configuration have been processed), in which case at 1224, the UE increments s to move on to the next SPS PDSCH configuration. The UE then repeats the same process for each SPS configuration until the UE determines at 1210 that s is no longer less than $N_c^{SPS}$ (e.g. all SPS configurations have been processed), in which case at 1226, the UE increments c to move on to the next cell or carrier. The UE then repeats the aforementioned process for each cell until the UE determines at 1206 that c is no longer less than $N_{cells}^{DL}$, at which point the process ends and all the HARQ-ACK information bits for the SPS PDSCH in each cell have been generated.

Referring again to FIG. 11, when the UE performs the process described above with respect to FIG. 12 of generating HARQ-ACK bits, the UE may check whether each SPS PDSCH reception being processed is associated with a cancelled PUCCH transmission (e.g. SPS PDSCH occasion 1114). If so, the UE may append the bit to the codebook as described above. Otherwise, the UE may ignore that SPS PDSCH occasion. Once the UE generates the codebook of HARQ-ACK information bits for unreported HARQ-ACKs outside window 1112, the UE may append the HARQ-ACK information bits to the Type-1 HARQ-ACK codebook including HARQ-ACK for PDSCH occasions 1102. In this way, the HARQ-ACK/NACK associated with SPS PDSCH occasion 1114 as well as other SPS PDSCH occasions that are received outside the window 1112 of slots may be deferred and not dropped.

Figure 13:
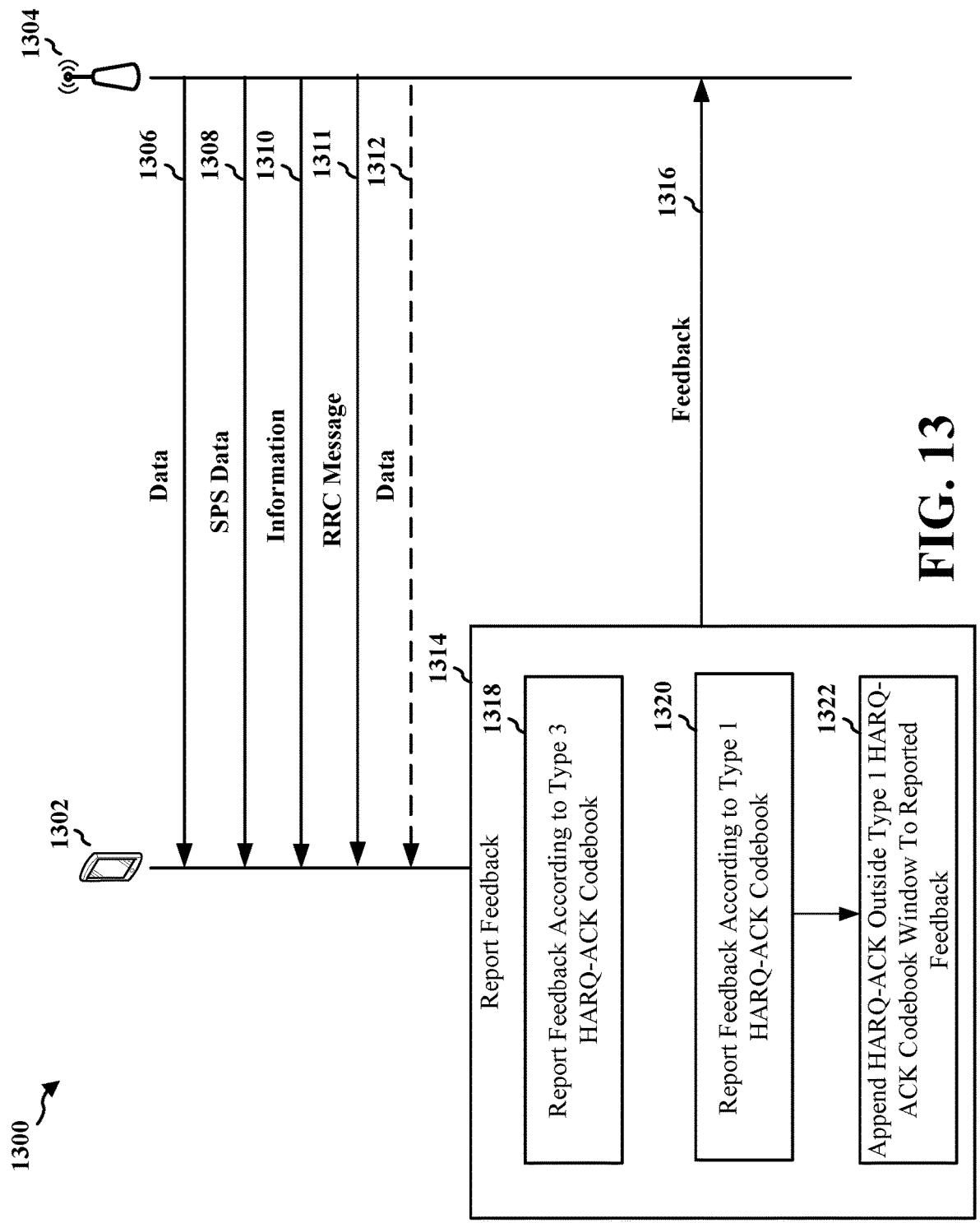
FIG. 13 is a call flow diagram between a UE and a base station.

FIG. 13 illustrates a diagram 1300 of a call flow between a UE 1302 and a base station 1304. The base station 1304 may transmit data 1306 to the UE 1302. Data 1306 may be, for example, dynamically scheduled data (e.g. dynamic DL data) in a PDSCH. The base station may also transmit SPS data 1308 to the UE 1302. SPS data 1308 may be, for example, semi-persistently scheduled data (e.g. SPS DL data) in a PDSCH.

The base station 1304 may transmit information 1310 and an RRC message 1311 to the UE 1302. The information 1310 may trigger feedback for a plurality of DL HARQ processes of the UE 1302, including DL HARQ processes associated with DL data transmissions for the UE (e.g. data 1306 and SPS data 1308). For example, the information 1310 may be DCI that includes a trigger for one-shot feedback reporting according to a Type-3 HARQ-ACK codebook, such as described above with respect to FIG. 5. The information 1310 may also include scheduling information for a new DL data transmission. For instance, the information 1310 may be DCI that schedules new data 1312 for the UE as well as trigger feedback reporting for the new data 1312. The UE 1302 may determine whether the DCI includes scheduling information based at least in part on a resource assignment field of the DCI, such as described above with respect to FIG. 6. The RRC message 1311 may configure the UE to report feedback for less than all of the DL HARQ processes triggered in information 1310, for instance, feedback for only SPS data 1308 (rather than for both data 1306 and SPS data 1308) or for some other subset of the DL HARQ processes.

The information 1310 (or RRC message 1311) may include an explicit indication to report feedback only for HARQ processes associated with SPS data transmissions (or other subset of HARQ processes), such as an additional bit in DCI or an information field setting in DCI. The explicit indication (or another explicit indication) may also indicate the UE to report feedback for all DL HARQ processes associated with SPS data transmissions or only for DL HARQ processes associated with SPS DL data transmissions for which a preceding PUCCH transmission was cancelled. Alternatively, the information 1310 (or RRC message 1311) may include an implicit indication to report feedback only for HARQ processes associated with SPS data transmissions, such as a configuration to monitor SFI or uplink transmission priority. The implicit indication (or another implicit indication) may also indicate the UE to report feedback for all DL HARQ processes associated with SPS data transmissions or only for DL HARQ processes associated with SPS DL data transmissions for which a preceding PUCCH transmission was cancelled.

At 1314, the UE 1302 may report HARQ feedback 1316 to the base station 1304. For example, at 1318, the UE may report feedback 1316 for all DL HARQ processes (e.g. in response to data 1306 [dynamic DL data] and SPS data 1308) or only for DL HARQ processes associated with SPS data transmissions (e.g. in response to only SPS data 1308), or otherwise for less than all of the DL HARQ processes triggered in information 1310, based at least in part on information 1310 and RRC message 1311. Such feedback reporting may be according to a Type-3 HARQ-ACK codebook, such as described above with respect to FIG. 5. If the UE determines that the information 1310 includes scheduling information for a new DL data transmission (e.g. data 1312), the feedback 1316 may be further for an HARQ process associated with the new DL data transmission. When the UE reports feedback 1316 only for DL HARQ processes associated with SPS data transmissions, the UE may report feedback for all DL HARQ processes associated with SPS data transmissions, or only for DL HARQ processes associated with SPS DL data transmissions for which a preceding PUCCH transmission was cancelled. When reporting feedback 1316 for all DL HARQ processes associated with SPS data transmissions, the UE may place bits in an HARQ payload based on an order of DL HARQ process followed by component carrier, or in an order of SPS configuration index followed by DL HARQ process followed by component carrier. When reporting feedback 1316 only for DL HARQ processes associated with SPS DL data transmissions for which a preceding PUCCH transmission was cancelled, the UE may place bits in an HARQ payload based on either order described above, or an order of cancelled PUCCH transmissions. The UE may also report feedback 1316 for a current occasion of each DL HARQ process associated with an SPS data transmission for which a preceding HARQ-ACK report on a PUCCH was cancelled, such as described above with respect to FIG. 7.

In another example, at 1320, the UE 1302 may report feedback 1316 to the base station 1304 including a plurality of HARQ-ACK bits in a PUCCH in a slot according to a Type-1 HARQ-ACK codebook, such as described above with respect to FIGS. 9 and 10. Each of the HARQ-ACK bits may be associated with SPS DL data associated with a cancelled PUCCH transmission and received in a window prior to the slot, such as SPS DL data in SPS PDSCH occasions 1102 received in window 1112 of FIG. 11. Moreover, at 1322, the UE may append to the feedback 1316 a HARQ-ACK bit associated with prior SPS DL data according to another codebook based on an SPS configuration, such as described above with respect to FIG. 12. The prior SPS DL data may be associated with another cancelled PUCCH transmission and received in another slot prior to the window, such as SPS DL data in SPS PDSCH occasion 1114 prior to window 1112 in FIG. 11. The window may include a number of slots K1max corresponding to a maximum value in a set of slot timing values K1, the slot in which the feedback is reported may be a slot n, and the other slot in which the prior SPS DL data is received may be a slot n−K1max.

Figure 14:
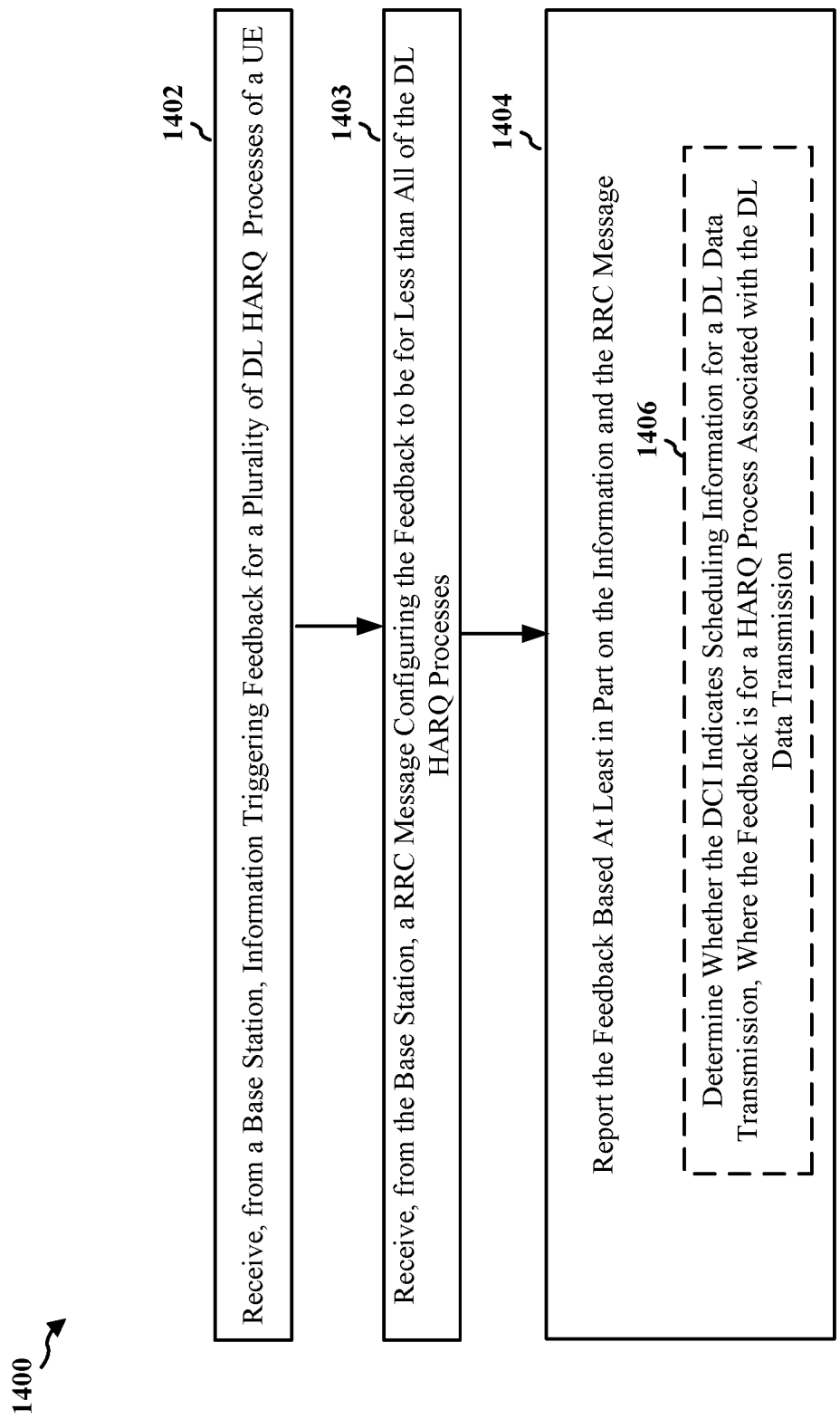
FIG. 14 is a flowchart of a method of wireless communication at a UE.

FIG. 14 is a flowchart 1400 of a method of wireless communication. The method may be performed by a UE (e.g., the UE 104, 350; the UE 1302, the apparatus 1602). Optional aspects are illustrated in dashed lines. The method allows a UE to report feedback according to a Type-3 HARQ-ACK codebook.

At 1402, the UE receives, from a base station, information triggering feedback for a plurality of DL HARQ processes of the UE. For example, 1402 may be performed by information component 1640. For example, referring to FIG. 13, the UE 1302 may receive information 1310 from the base station 1304 triggering feedback 1316 for a plurality of DL HARQ processes of the UE 1302, including DL HARQ processes associated with DL data transmissions for the UE (e.g. data 1306 and SPS data 1308). For example, referring to FIG. 4, the DL HARQ processes may be associated with SPS PDSCH 404 or dynamically scheduled PDSCH in downlink slots 402, and the information 1310 may trigger HARQ-ACK/NACK feedback for the SPS PDSCH 404 or dynamically scheduled PDSCH. Similarly, referring to FIG. 7, the DL HARQ processes may be associated with SPS PDSCH occasions 702, 704, 706, 708, and the information 1310 may trigger HARQ-ACK/NACK associated with the SPS PDSCH occasions.

The information may comprise downlink control information (DCI), where the DCI comprises a trigger for one-shot feedback reporting according to a Type-3 HARQ-acknowledgment (ACK) codebook. For example, referring to FIG. 13, the information 1310 may be DCI that includes a trigger for one-shot feedback reporting according to a Type-3 HARQ-ACK codebook. The UE may generate the Type-3 HARQ-ACK codebook, for example, as described above in flowchart 500 of FIG. 5.

The information may comprise an indication to report the feedback for only the DL HARQ processes associated with SPS data transmissions. The indication may include a bit in DCI, an information field setting in the DCI, a configuration to monitor a SFI, or an uplink transmission priority. For example, referring to FIG. 13, the information 1310 may include an explicit indication to report feedback 1316 only for HARQ processes associated with SPS data 1308 (or other subset of HARQ processes), such as additional bit(s) in DCI or information field setting(s) in DCI indicating the feedback condition to the UE. For example, if the base station configures the UE with an SPS configuration including assigned resources for SPS DL data and sends a DCI to the UE activating the assigned resources and indicating for the UE to perform one shot HARQ reporting as described above with respect to FIG. 5, the base station may include an additional bit in the DCI which indicates to the UE whether to report HARQ-ACK for both dynamic DL data and SPS DL data, or whether to only report HARQ-ACK for SPS DL data. Alternatively, the base station may configure an information field in the DCI with a pre-defined setting, such as an MCS field with a bit pattern of all 0's or some other field or bit pattern, to indicate to the UE whether to report HARQ-ACK for both dynamic DL data and SPS DL data, or whether to only report HARQ-ACK for SPS DL data.

Alternatively, the information 1310 may include an implicit indication to report feedback 1316 only for HARQ processes associated with SPS data 1308 (or other subset of HARQ processes), such as a configuration to monitor SFI or an uplink transmission priority. In such case, the SFI or uplink transmission priority may indicate the feedback condition to the UE. For example, the base station may implicitly configure the UE to generate the Type-3 HARQ-ACK codebook with HARQ-ACK/NACKs for all HARQ processes (e.g. for dynamic DL data and SPS DL data), or only for SPS DL data (or other subset of HARQ processes), based on whether the UE is configured to monitor a SFI or based on an uplink transmission priority for the HARQ-ACK/NACKs. For example, if the base station configures the UE to monitor SFI or if the uplink transmission priority of HARQ-ACK/NACK for scheduled data is low, the UE may determine that more SPS PDSCH transmissions than dynamically scheduled PDSCH transmissions are likely to be received, and thus the UE may reduce the HARQ payload by only reporting feedback for HARQ processes associated with SPS data.

The information 1310 may comprise an indication to report the feedback for only the DL HARQ processes associated with SPS data transmissions for which a preceding PUCCH transmission was canceled. For example, referring to FIG. 13, the explicit or implicit indication described above (e.g., a bit in DCI, an information field setting in DCI, a configuration to monitor a SFI, or an uplink transmission priority), may indicate the UE to report feedback 1316 for all DL HARQ processes associated with SPS data 1308 or only for DL HARQ processes associated with SPS data 1308 for which a preceding PUCCH transmission was cancelled. For instance, referring to FIG. 4, the UE may determine from the indication whether to report HARQ-ACK/NACK for SPS PDSCH 404 in any of the downlink slots 402, 410, or only HARQ-ACK/NACK for SPS PDSCH 404 in the downlink slot 410 where the UE had cancelled the PUCCH transmission.

At 1403, the UE receives, from the base station, a RRC message configuring the feedback to be for less than all of the DL HARQ processes. For example, 1403 may be performed by RRC message component 1646. For instance, referring to FIG. 13, UE 1302 may receive, from base station 1304, RRC message 1311 configuring the UE to report feedback 1316 for only SPS data 1308 (rather than for both SPS data 1308 and data 1306, which is dynamically scheduled). For example, the UE may receive an RRC message or be otherwise configured by the base station outside of DCI to report Type-3 HARQ-ACK codebooks triggered by DCI for only SPS DL data. Thus, the RRC message may configure the UE to report Type-3 HARQ-ACK codebooks for less than all HARQ processes (e.g., only SPS DL data), reducing the HARQ payload. Alternatively, RRC message 1311 may configure the UE to report feedback for some other subset of the DL HARQ processes.

At 1404, the UE reports the feedback based at least in part on the information and the RRC message. For example, 1404 may be performed by Type-3 HARQ feedback component 1642. For instance, referring to FIG. 13, at 1314, the UE 1302 may report HARQ feedback 1316 to the base station 1304. The UE may report the feedback 1316 in response to receiving information 1310 and RRC message 1311 triggering the UE 1302 to report feedback for less than all configured DL HARQ processes according to a Type 3 HARQ-ACK codebook. For instance, at 1318, the UE may report feedback 1316 only for DL HARQ processes associated with SPS data transmissions (e.g. in response to only SPS data 1308, rather than also in response to data 1306 [dynamic DL data]).

At 1406, the UE may determine whether the information (e.g., the DCI) includes scheduling information for a DL data transmission, and the feedback may be further for a HARQ process associated with the DL data transmission. For example, 1406 may be performed by determination component 1644. The determination may be based at least in part on a resource assignment field of the DCI. For instance, referring to FIG. 13, the UE 1302 may determine that the information 1310 includes scheduling information for a new DL data transmission (e.g. data 1312), based at least in part on a resource assignment field of the DCI, such as described above with respect to FIG. 6 (e.g., at 606, 608, and 610). In such case, the UE may report feedback 1316 (e.g., at 1404) further for a HARQ process associated with the data 1312.

In one example, the DL HARQ processes may be associated with SPS data transmissions, and the feedback may include HARQ payload bits placed in an order of an SPS configuration index for the SPS data transmissions, followed by a HARQ process index for each of the DL HARQ processes, followed by a cell index for a component carrier including the SPS data transmission associated with the DL HARQ processes. For example, referring to FIGS. 5 and 13, when the UE 1302 generates HARQ-ACK/NACK bits in the feedback 1316 (e.g., for SPS data 1308) in response to information 1310, the UE may place the bits in the HARQ payload or Type-3 codebook in order of SPS configuration index, HARQ processes (corresponding to index h in FIG. 5), and then carriers (corresponding to index c in FIG. 5). For instance, if the base station 1304 configures the UE 1302 with multiple SPS configurations, the UE may first generate a HARQ-ACK bit associated with each SPS configuration for a given cell c, HARQ process h, and transport block t, and then follow the steps described above with respect to FIG. 5 including repeating the bit generation for each transport block while $t<N_{TB,c}^{DL}$, followed by each HARQ process while $h<N_{HARQ,c}^{DL}$, followed by each carrier while $c<N_{cells}^{DL}$. For instance, after checking whether $t<N_{TB,c}^{DL}$ at block 508, the UE may confirm whether an SPS configuration index (e.g., s) is less than a number of configured SPS configurations, before proceeding to 510 as described above.

In another example, the DL HARQ processes may be associated with SPS data transmissions, and the feedback may include HARQ payload bits placed in an order of an SPS PDSCH occasion associated with a cancelled PUCCH transmission for each of the SPS data transmissions. For example, referring to FIGS. 5 and 13, the UE 1302 may generate feedback 1316 for cancelled HARQ-ACK/NACKs (e.g., for SPS PDSCH 404 in the downlink slot 410) based on the order of SPS DL data reception or PDSCH occasion in the time domain (e.g., SPS data 1308, or SPS PDSCH 404 or SPS PDSCH occasions 702, 704, 706, 708 of FIGS. 4 and 7 respectively), rather than in order of HARQ process (e.g., index h in FIG. 5) as described above. As an example, the SPS DL data associated with cancelled PUCCH transmissions may be received chronologically in order of HARQ process 3, HARQ process 0, and HARQ process 1. That is, a first SPS PDSCH occasion received in time may be associated with HARQ process 3, a second SPS PDSCH occasion next received in time may be associated with HARQ process 0, and a third SPS PDSCH occasion subsequently received in time may be associated with HARQ process 1. In such case, rather than generating the feedback in order of HARQ process (i.e. second SPS PDSCH occasion for HARQ process 0, third SPS PDSCH occasion for HARQ process 1, and first SPS PDSCH occasion for HARQ process 3), the UE may generate the feedback in order of SPS PDSCH occasion. Thus, referring to FIG. 5, rather than generating HARQ-ACK/NACK bits for each HARQ process in order of h while $h<N_{HARQ,c}^{DL}$, the UE may instead generate HARQ-ACK/NACK bits in order of PDSCH reception. Thus, for each component carrier in this example, the HARQ-ACK information bit for HARQ process 3 may be set first, followed by the HARQ-ACK information bit for HARQ process 0, followed by the HARQ-ACK information bit for HARQ process 1.

The feedback may be for a current occasion of a HARQ process for which a preceding HARQ-ACK report on a physical uplink control channel (PUCCH) was canceled. For instance, referring to FIG. 13, the UE 1302 may report feedback 1316 for a current occasion of each DL HARQ process associated with an SPS data transmission (e.g., SPS data 1308 in SPS PDSCH occasions 702, 704, 706, 708 of FIG. 7) for which a preceding HARQ-ACK report on a PUCCH was cancelled, such as described above with respect to FIG. 7. For example, referring to FIG. 7, if the UE cancels HARQ-ACK associated with HARQ Process 0 for the first SPS PDSCH occasion 702 in the first scheduled PUCCH as described above, but in this example later receives a DCI triggering Type 3 codebook reporting in the third scheduled PUCCH (which occurs after the third SPS PDSCH occasion 706 also associated with HARQ Process 0), a conflict may arise regarding which HARQ Process 0 the UE may include when generating the Type 3-HARQ codebook: the new HARQ process 0 associated with the third SPS PDSCH occasion 706 or the old, dropped HARQ Process 0 associated with the first SPS PDSCH occasion 702. To address this conflict, the UE may drop the old HARQ Process 0 from the Type 3-HARQ codebook generation, and replace it with the one associated with the new (current) SPS PDSCH occasion. For instance, when reporting HARQ-ACK feedback in the third scheduled PUCCH, the UE may generate the HARQ-ACK/NACK bits for the Type 3 codebook with HARQ process 0 associated with the third SPS PDSCH occasion 706 and HARQ process 1 associated with the second SPS PDSCH occasion 704, while ignoring or dropping HARQ process 0 associated with the first SPS PDSCH occasion 702.

Figure 15:
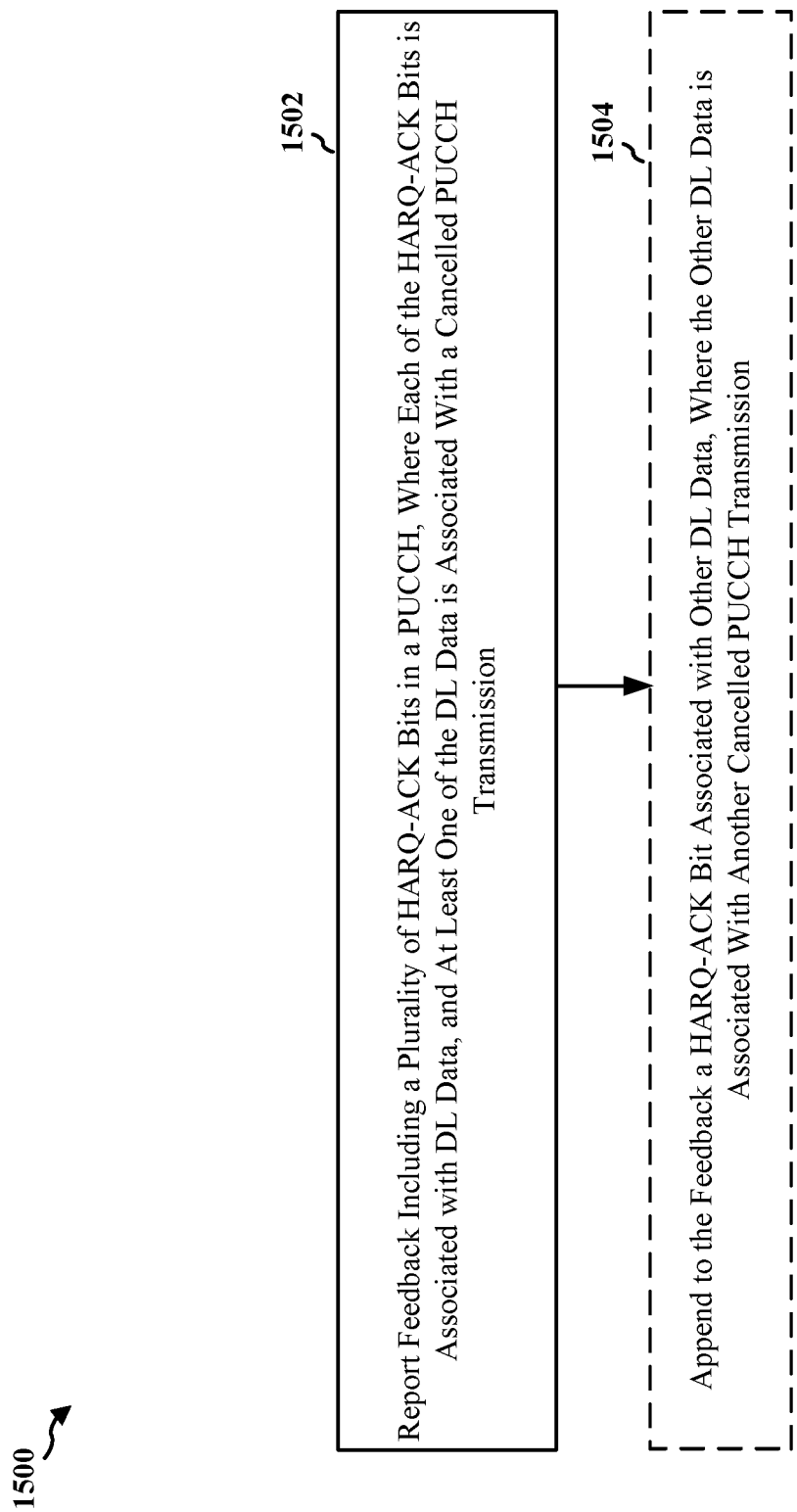
FIG. 15 is a flowchart of another method of wireless communication at a UE.

FIG. 15 is a flowchart 1500 of a method of wireless communication. The method may be performed by a UE (e.g., the UE 104, 350; the UE 1302, the apparatus 1602). Optional aspects are illustrated in dashed lines. The method allows a UE to report feedback according to a Type-1 HARQ-ACK codebook.

At 1502, the UE reports feedback including a plurality of HARQ-ACK bits in a PUCCH, where each of the HARQ-ACK bits is associated with DL data, and at least one of the DL data is associated with a cancelled PUCCH transmission. For example, 1502 may be performed by Type-1 HARQ feedback component 1648. For instance, referring to FIG. 13, the UE 1302 may report feedback 1316 according to a Type-1 HARQ-ACK codebook at 1318. In one example, the DL data may be SPS DL data. For example, referring to FIG. 11, the UE may transmit HARQ-ACK bits for the SPS PDSCH occasions 1102 (including SPS data 1308 in FIG. 13) associated with cancelled PUCCH transmissions 1106 in the same PUCCH occasion 1110 associated with SPS PDSCH occasion 1108. In other examples, the DL data may be dynamically scheduled DL data. For example, the SPS PDSCH occasions referenced in the aforementioned example may be replaced with dynamically scheduled PDSCH occasions and/or a combination of dynamically scheduled and SPS PDSCH occasions, and the UE may transmit HARQ-ACK bits for the PDSCH occasions (including data 1306 ([dynamically scheduled DL data] and/or SPS data 1308) associated with cancelled PUCCH transmissions 1106 in the same PUCCH occasion 1110.

The feedback may be reported in a slot, and each of the DL data may be in a window prior to the slot. For example, referring to FIGS. 11 and 13, the UE 1302 may report feedback 1316 in PUCCH occasion 1110, which is validly scheduled in an uplink slot, and the SPS PDSCH occasions 1102 associated with cancelled PUCCH transmissions 1106 may be within window 1112 of slots spanning a length $K1_{max}$ as described above with respect to FIGS. 9 and 10. For instance, the number of slots $K1_{max}$ may correspond to a maximum value in a set of slot timing values K1, the slot in which the feedback 1316 is reported may be a slot n, and the window 1112 may include slots n−1, n−2 . . . to n−K1 max.

At 1504, the UE may append to the feedback a HARQ-ACK bit associated with other DL data, where the other DL data is associated with another cancelled PUCCH transmission. For example, 1504 may be performed by append component 1650. In one example, the other DL data may be SPS DL data. For instance, referring to FIG. 13, the UE 1302 may append HARQ-ACK for SPS data 1308 received outside the Type-1 HARQ-ACK codebook window to the feedback 1316 at 1320. The feedback may be according to a Type 1 HARQ-ACK codebook, and the HARQ-ACK bit appended to the feedback may be according to another codebook based on an SPS PDSCH configuration. For instance, referring to FIG. 11, the UE may generate and place HARQ-ACK bits corresponding to SPS PDSCH occasions 1102 in a Type-1 HARQ codebook as described above with respect to FIGS. 9 and 10, and then generate HARQ-ACK bits for SPS PDSCH occasion 1114 or other SPS PDSCH occasions outside window 1112 according to an SPS configuration-based codebook, such as described above with respect to FIG. 12 (or according to some other codebook or manner). The UE may then append the HARQ-ACK bits for the outside SPS PDSCH occasions to the Type-1 HARQ codebook. Thus, the other SPS DL data associated with the appended HARQ-ACK bit may be, for example, SPS DL data 1308 in SPS PDSCH occasion 1114 or other SPS PDSCH occasions outside window 1112 which are associated with cancelled PUCCH transmissions 1106. In other examples, the other DL data may be dynamically scheduled DL data. For example, the SPS PDSCH occasions referenced in the aforementioned example may be replaced with dynamically scheduled PDSCH occasions and/or a combination of dynamically scheduled and SPS PDSCH occasions, and the other DL data associated with the appended HARQ-ACK bit may be, for example, data 1306 (dynamically scheduled DL data) in PDSCH occasions outside window 1112 which are associated with cancelled PUCCH transmissions 1106.

The feedback may be reported in a slot, each of the DL data may be in a window prior to the slot, and the other DL data may be in another slot prior to the window. For example, referring to FIGS. 11 and 13, the UE 1302 may report feedback 1316 in PUCCH occasion 1110, which is validly scheduled in an uplink slot, and the SPS PDSCH occasions 1102 associated with cancelled PUCCH transmissions 1106 may be within window 1112 of slots spanning a length $K1_{max}$ as described above with respect to FIGS. 9 and 10. For instance, the number of slots $K1_{max}$ may correspond to a maximum value in a set of slot timing values K1, the slot in which the feedback 1316 is reported may be a slot n, and the window 1112 may include slots n−1, n−2 . . . to n−$K1_{max}$. Thus, the SPS PDSCH occasion 1114 outside window 1112 may be in a slot n−$K1_{max}$−1 or earlier. Nevertheless, as the size of window 1112 ($K1_{max}$) can flexibly be any set of configured value(s) (e.g., from 0 to 15 based on base station configured parameter dl-DataToUL-ACK), the UE may effectively append HARQ-bits for any of the configured SPS PDSCH occasions (e.g., SPS PDSCH occasions 1102 or SPS PDSCH occasion 1114) to the Type-1 HARQ codebook.

Figure 16:
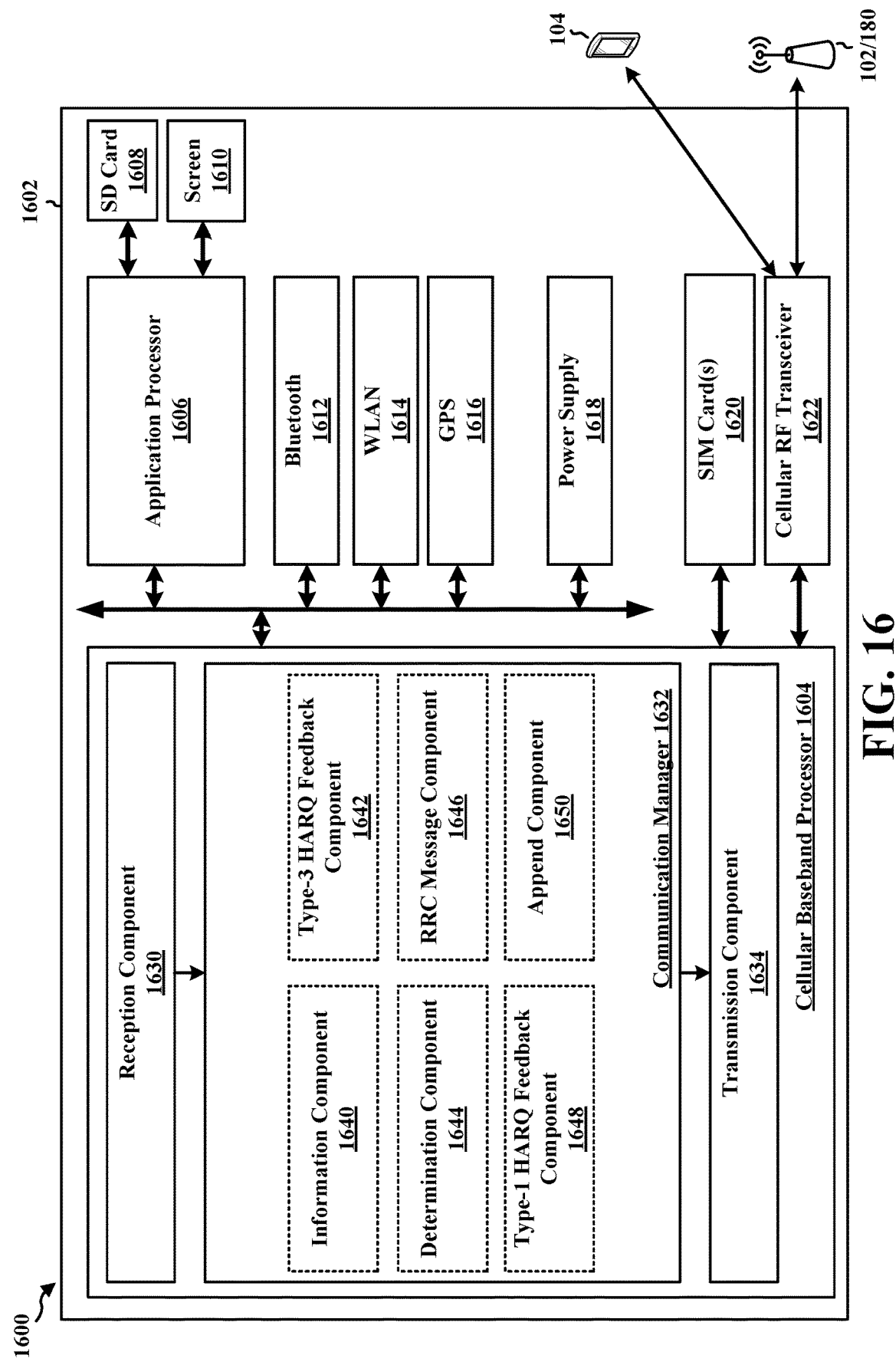
FIG. 16 is a diagram illustrating an example of a hardware implementation for an example apparatus.

FIG. 16 is a diagram 1600 illustrating an example of a hardware implementation for an apparatus 1602. The apparatus 1602 is a UE and includes a cellular baseband processor 1604 (also referred to as a modem) coupled to a cellular RF transceiver 1622 and one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/ memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the aforediscussed additional modules of the apparatus 1602.

The communication manager 1632 includes an information component 1640 that is configured to receive, from a base station, information triggering feedback for a plurality of DL HARQ processes of the UE, e.g., as described in connection with 1402. The communication manager 1632 further includes a RRC message component 1646 that is configured to receive, from the base station, a RRC message configuring the feedback to be for less than all of the DL HARQ processes, e.g., as described in connection with 1403. The communication manager 1632 further includes a Type-3 HARQ feedback component 1642 that receives input in the form of information from the components 1640, 1646 and is configured to report the feedback based at least in part on the information and the RRC message, e.g., as described in connection with 1404. The communication manager 1632 further includes a determination component 1644 that receives input in the form of information (e.g. DCI) from the component 1640 and is configured to determine whether the DCI includes scheduling information for a DL data transmission, where the feedback is further for a HARQ process associated with the DL data transmission, e.g., as described in connection with 1406.

The communication manager 1632 further includes a Type-1 HARQ feedback component 1648 that is configured to report feedback including a plurality of HARQ-ACK bits in a PUCCH, wherein each of the HARQ-ACK bits is associated with DL data, and at least one of the DL data is associated with a cancelled PUCCH transmission, e.g., as described in connection with 1502. The communication manager 1632 further includes an append component 1650 that receives input in the form of feedback from the component 1648 and is configured to append to the feedback a HARQ-ACK bit associated with other DL data, where the other DL data is associated with another cancelled PUCCH transmission, e.g., as described in connection with 1504.

The apparatus may include additional components that perform each of the blocks of the algorithm in the aforementioned flowcharts of FIGS. 13, 14 and 15. As such, each block in the aforementioned flowcharts of FIGS. 13, 14 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the cellular baseband processor 1604, includes means for receiving, from a base station, information triggering feedback for a plurality of DL HARQ processes of the UE, where the means for receiving is further configured to receive, from the base station, a RRC message configuring the feedback to be for less than all of the DL HARQ processes, and means for reporting the feedback based at least in part on the information and the RRC message. In one configuration, the apparatus 1602, and in particular the cellular baseband processor 1604, may include means for determining whether the DCI includes scheduling information for a DL data transmission, where the feedback is further for a HARQ process associated with the DL data transmission.

In one configuration, the apparatus 1602, and in particular the cellular baseband processor 1604, includes means for reporting feedback including a plurality of HARQ-ACK bits in a PUCCH, wherein each of the HARQ-ACK bits is associated with DL data, and at least one of the DL data is associated with a cancelled PUCCH transmission. In one configuration, the apparatus 1602, and in particular the cellular baseband processor 1604, may include means for appending to the feedback a HARQ-ACK bit associated with other DL data, wherein the other DL data is associated with another cancelled PUCCH transmission.

The aforementioned means may be one or more of the aforementioned components of the apparatus 1602 configured to perform the functions recited by the aforementioned means. As described supra, the apparatus 1602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 17:
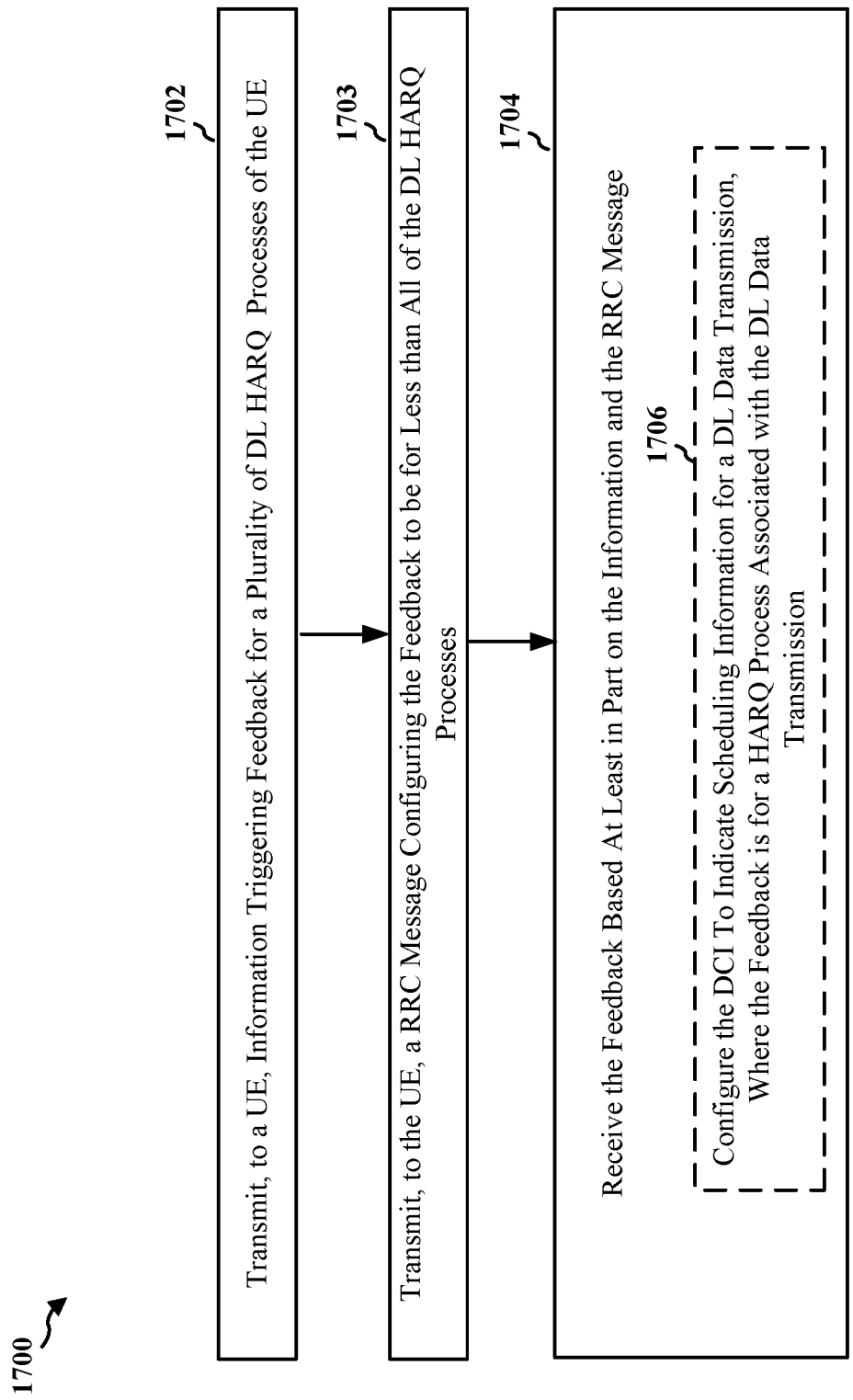
FIG. 17 is a flowchart of a method of wireless communication at a base station.

FIG. 17 is a flowchart 1700 of a method of wireless communication. The method may be performed by a base station (e.g., the base station 102/180, 310; the base station 1304; the apparatus 1902). Optional aspects are illustrated in dashed lines. The method allows a base station to receive feedback according to a Type-3 HARQ-ACK codebook from a UE.

At 1702, the base station transmits, to a UE, information triggering feedback for a plurality of DL HARQ processes of the UE. For example, 1702 may be performed by information component 1940. For example, referring to FIG. 13, the base station 1304 may transmit information 1310 to UE 1302 triggering feedback 1316 for a plurality of DL HARQ processes of the UE 1302, including DL HARQ processes associated with DL data transmissions for the UE (e.g. data 1306 and SPS data 1308). For example, referring to FIG. 4, the DL HARQ processes may be associated with SPS PDSCH 404 or dynamically scheduled PDSCH in downlink slots 402, and the information 1310 may trigger HARQ-ACK/NACK feedback for the SPS PDSCH 404 or dynamically scheduled PDSCH. Similarly, referring to FIG. 7, the DL HARQ processes may be associated with SPS PDSCH occasions 702, 704, 706, 708, and the information 1310 may trigger HARQ-ACK/NACK associated with the SPS PDSCH occasions.

The information may comprise downlink control information (DCI), where the DCI comprises a trigger for one-shot feedback reporting according to a Type-3 HARQ-acknowledgment (ACK) codebook. For example, referring to FIG. 13, the information 1310 may be DCI that includes a trigger for one-shot feedback reporting according to a Type-3 HARQ-ACK codebook. The base station may trigger the UE to generate the Type-3 HARQ-ACK codebook, for example, as described above in flowchart 500 of FIG. 5.

The information may comprise an indication to the UE to report the feedback for only the DL HARQ processes associated with SPS data transmissions. The indication may include a bit in DCI, an information field setting in the DCI, a configuration to monitor a SFI, or an uplink transmission priority. For example, referring to FIG. 13, the information 1310 may include an explicit indication to UE 1302 to report feedback 1316 only for HARQ processes associated with SPS data 1308 (or other subset of HARQ processes), such as additional bit(s) in DCI or information field setting(s) in DCI indicating the feedback condition to the UE. For example, if the base station configures the UE with an SPS configuration including assigned resources for SPS DL data and sends a DCI to the UE activating the assigned resources and indicating for the UE to perform one shot HARQ reporting as described above with respect to FIG. 5, the base station may include an additional bit in the DCI which indicates to the UE whether to report HARQ-ACK for both dynamic DL data and SPS DL data, or whether to only report HARQ-ACK for SPS DL data. Alternatively, the base station may configure an information field in the DCI with a pre-defined setting, such as an MCS field with a bit pattern of all 0's or some other field or bit pattern, to indicate to the UE whether to report HARQ-ACK for both dynamic DL data and SPS DL data, or whether to only report HARQ-ACK for SPS DL data.

Alternatively, the information 1310 may include an implicit indication to the UE to report feedback 1316 only for HARQ processes associated with SPS data 1308 (or other subset of HARQ processes), such as a configuration to monitor SFI or an uplink transmission priority. In such case, the SFI or uplink transmission priority may indicate the feedback condition to the UE. For example, the base station may implicitly configure the UE to generate the Type-3 HARQ-ACK codebook with HARQ-ACK/NACKs for all HARQ processes (e.g. for dynamic DL data and SPS DL data), or only for SPS DL data (or other subset of HARQ processes), based on whether the UE is configured to monitor a SFI or based on an uplink transmission priority for the HARQ-ACK/NACKs. For example, if the base station configures the UE to monitor SFI or if the uplink transmission priority of HARQ-ACK/NACK for scheduled data is low, the UE may determine that more SPS PDSCH transmissions than dynamically scheduled PDSCH transmissions are likely to be received, and thus the UE may reduce the HARQ payload by only reporting feedback for HARQ processes associated with SPS data.

The information 1310 may comprise an indication to the UE to report the feedback for only the DL HARQ processes associated with SPS data transmissions for which a preceding PUCCH transmission was canceled. For example, referring to FIG. 13, the explicit or implicit indication described above (e.g., a bit in DCI, an information field setting in DCI, a configuration to monitor a SFI, or an uplink transmission priority), may indicate the UE to report feedback 1316 for all DL HARQ processes associated with SPS data 1308 or only for DL HARQ processes associated with SPS data 1308 for which a preceding PUCCH transmission was cancelled. For instance, referring to FIG. 4, the UE may determine from the indication whether to report HARQ-ACK/NACK for SPS PDSCH 404 in any of the downlink slots 402, 410, or only HARQ-ACK/NACK for SPS PDSCH 404 in the downlink slot 410 where the UE had cancelled the PUCCH transmission.

At 1703, the base station transmits, to the UE, a RRC message configuring the feedback to be for less than all of the DL HARQ processes. For example, 1703 may be performed by RRC message component 1946. For instance, referring to FIG. 13, base station 1304 may transmit, to UE 1302, RRC message 1311 configuring the UE to report feedback 1316 for only SPS data 1308 (rather than for both SPS data 1308 and data 1306, which is dynamically scheduled). For example, the UE may receive an RRC message or be otherwise configured by the base station outside of DCI to report Type-3 HARQ-ACK codebooks triggered by DCI for only SPS DL data. Thus, the RRC message may configure the UE to report Type-3 HARQ-ACK codebooks for less than all HARQ processes (e.g., only SPS DL data), reducing the HARQ payload. Alternatively, RRC message 1311 may configure the UE to report feedback for some other subset of the DL HARQ processes.

At 1704, the base station receives the feedback based at least in part on the information and the RRC message. For example, 1704 may be performed by Type-3 HARQ feedback component 1942. For instance, referring to FIG. 13, at 1314, the base station 1304 may receive HARQ feedback 1316 reported from the UE 1302. The base station may receive the feedback 1316 in response to transmitting information 1310 and RRC message 1311 triggering the UE 1302 to report feedback for less than all configured DL HARQ processes according to a Type 3 HARQ-ACK codebook. For instance, at 1318, the UE may report feedback 1316 only for DL HARQ processes associated with SPS data transmissions (e.g. in response to only SPS data 1308, rather than also in response to data 1306 [dynamic DL data]).

At 1706, the base station may configure the information (e.g., the DCI) to indicate scheduling information for a DL data transmission, and the feedback may be further for a HARQ process associated with the DL data transmission. For example, 1706 may be performed by configuration component 1944. The configuration may be based at least in part on a resource assignment field of the DCI. For instance, referring to FIG. 13, the base station 1304 may configure the information 1310 to include scheduling information for a new DL data transmission (e.g. data 1312), based at least in part on a resource assignment field of the DCI, such as described above with respect to FIG. 6 (e.g., at 606, 608, and 610). In such case, the UE may report feedback 1316 (e.g., at 1404) further for a HARQ process associated with the data 1312.

In one example, the DL HARQ processes may be associated with SPS data transmissions, and the feedback may include HARQ payload bits placed in an order of an SPS configuration index for the SPS data transmissions, followed by a HARQ process index for each of the DL HARQ processes, followed by a cell index for a component carrier including the SPS data transmission associated with the DL HARQ processes. For example, referring to FIGS. 5 and 13, when the UE 1302 generates HARQ-ACK/NACK bits in the feedback 1316 (e.g., for SPS data 1308) in response to information 1310, the base station may receive the bits placed in the HARQ payload or Type-3 codebook in order of SPS configuration index, HARQ processes (corresponding to index h in FIG. 5), and then carriers (corresponding to index c in FIG. 5). For instance, if the base station 1304 configures the UE 1302 with multiple SPS configurations, the UE may first generate a HARQ-ACK bit associated with each SPS configuration for a given cell c, HARQ process h, and transport block t, and then follow the steps described above with respect to FIG. 5 including repeating the bit generation for each transport block while $t < N_{TB,c}^{DL}$, followed by each HARQ process while $h < N_{HARQ,c}^{DL}$, followed by each carrier while $c < N_{cells}^{DL}$. For instance, after checking whether $t < N_{TB,c}^{DL}$ at block 508, the UE may confirm whether an SPS configuration index (e.g., s) is less than a number of configured SPS configurations, before proceeding to 510 as described above.

In another example, the DL HARQ processes may be associated with SPS data transmissions, and the feedback may include HARQ payload bits placed in an order of an SPS PDSCH occasion associated with a cancelled PUCCH transmission for each of the SPS data transmissions. For example, referring to FIGS. 5 and 13, the base station 1304 may receive feedback 1316 generated by the UE for cancelled HARQ-ACK/NACKs (e.g., for SPS PDSCH 404 in the downlink slot 410) based on the order of SPS DL data reception or PDSCH occasion in the time domain (e.g., SPS data 1308, or SPS PDSCH 404 or SPS PDSCH occasions 702, 704, 706, 708 of FIGS. 4 and 7 respectively), rather than in order of HARQ process (e.g., index h in FIG. 5) as described above. As an example, the SPS DL data associated with cancelled PUCCH transmissions may be transmitted to the UE chronologically in order of HARQ process 3, HARQ process 0, and HARQ process 1. That is, a first SPS PDSCH occasion transmitted in time may be associated with HARQ process 3, a second SPS PDSCH occasion next transmitted in time may be associated with HARQ process 0, and a third SPS PDSCH occasion subsequently transmitted in time may be associated with HARQ process 1. In such case, rather than generating the feedback in order of HARQ process (i.e. second SPS PDSCH occasion for HARQ process 0, third SPS PDSCH occasion for HARQ process 1, and first SPS PDSCH occasion for HARQ process 3), the UE may generate the feedback in order of SPS PDSCH occasion. Thus, referring to FIG. 5, rather than generating HARQ-ACK/NACK bits for each HARQ process in order of h while $h < N_{HARQ,c}^{DL}$, the UE may instead generate HARQ-ACK/NACK bits in order of PDSCH reception. Thus, for each component carrier in this example, the HARQ-ACK information bit for HARQ process 3 may be set first, followed by the HARQ-ACK information bit for HARQ process 0, followed by the HARQ-ACK information bit for HARQ process 1.

The feedback may be for a current occasion of a HARQ process for which a preceding HARQ-ACK report on a physical uplink control channel (PUCCH) was canceled. For instance, referring to FIG. 13, the base station 1304 may receive feedback 1316 for a current occasion of each DL HARQ process associated with an SPS data transmission (e.g., SPS data 1308 in SPS PDSCH occasions 702, 704, 706, 708 of FIG. 7) for which a preceding HARQ-ACK report on a PUCCH was cancelled, such as described above with respect to FIG. 7. For example, referring to FIG. 7, if the UE cancels HARQ-ACK associated with HARQ Process 0 for the first SPS PDSCH occasion 702 in the first scheduled PUCCH as described above, but in this example later receives a DCI triggering Type 3 codebook reporting in the third scheduled PUCCH (which occurs after the third SPS PDSCH occasion 706 also associated with HARQ Process 0), a conflict may arise regarding which HARQ Process 0 the UE may include when generating the Type 3-HARQ codebook: the new HARQ process 0 associated with the third SPS PDSCH occasion 706 or the old, dropped HARQ Process 0 associated with the first SPS PDSCH occasion 702. To address this conflict, the UE may drop the old HARQ Process 0 from the Type 3-HARQ codebook generation, and replace it with the one associated with the new (current) SPS PDSCH occasion. For instance, when reporting HARQ-ACK feedback in the third scheduled PUCCH, the UE may generate the HARQ-ACK/NACK bits for the Type 3 codebook with HARQ process 0 associated with the third SPS PDSCH occasion 706 and HARQ process 1 associated with the second SPS PDSCH occasion 704, while ignoring or dropping HARQ process 0 associated with the first SPS PDSCH occasion 702.

Figure 18:
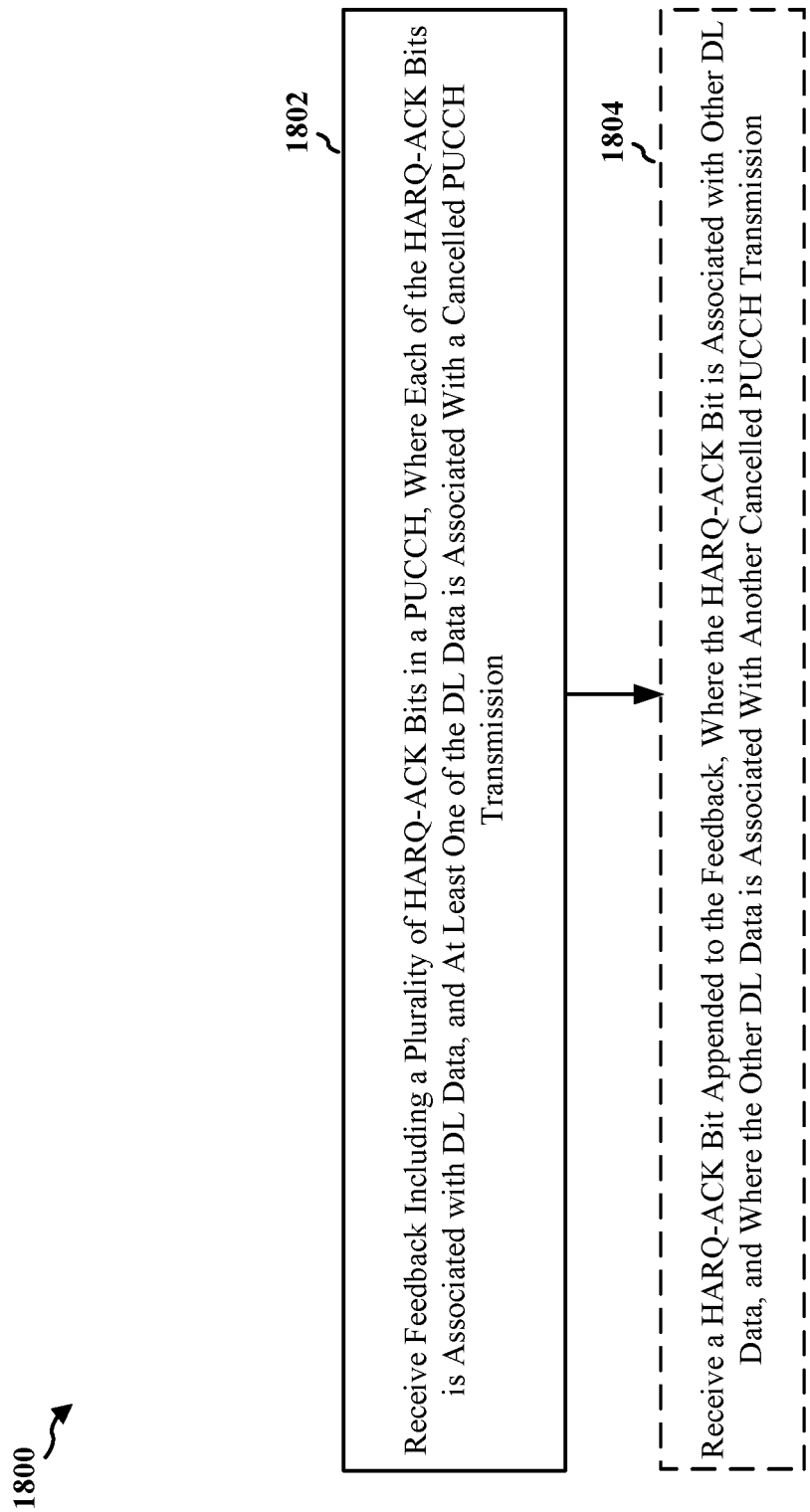
FIG. 18 is a flowchart of another method of wireless communication at a base station.

FIG. 18 is a flowchart 1800 of a method of wireless communication. The method may be performed by a base station (e.g., the base station 102/180, 310; the base station 1304; the apparatus 1902). Optional aspects are illustrated in dashed lines. The method allows a base station to receive feedback according to a Type-1 HARQ-ACK codebook.

At 1802, the base station receives feedback including a plurality of HARQ-ACK bits in a PUCCH, where each of the HARQ-ACK bits is associated with DL data, and at least one of the DL data is associated with a cancelled PUCCH transmission. For example, 1802 may be performed by Type-1 HARQ feedback component 1948. For instance, referring to FIG. 13, the base station 1304 may receive feedback 1316 according to a Type-1 HARQ-ACK codebook at 1318. In one example, the DL data may be SPS DL data. For example, referring to FIG. 11, the base station may receive HARQ-ACK bits for the SPS PDSCH occasions 1102 (including SPS data 1308 in FIG. 13) associated with cancelled PUCCH transmissions 1106 in the same PUCCH occasion 1110 associated with SPS PDSCH occasion 1108. In other examples, the DL data may be dynamically scheduled DL data. For example, the SPS PDSCH occasions referenced in the aforementioned example may be replaced with dynamically scheduled PDSCH occasions and/or a combination of dynamically scheduled and SPS PDSCH occasions, and the base station may receive HARQ-ACK bits for the PDSCH occasions (including data 1306 ([dynamically scheduled DL data] and/or SPS data 1308) associated with cancelled PUCCH transmissions 1106 in the same PUCCH occasion 1110.

The feedback may be received in a slot, and each of the DL data may be in a window prior to the slot. For example, referring to FIGS. 11 and 13, the base station 1304 may receive feedback 1316 in PUCCH occasion 1110, which is validly scheduled in an uplink slot, and the SPS PDSCH occasions 1102 associated with cancelled PUCCH transmissions 1106 may be within window 1112 of slots spanning a length $K1_{max}$ as described above with respect to FIGS. 9 and 10. For instance, the number of slots $K1_{max}$ may correspond to a maximum value in a set of slot timing values K1, the slot in which the feedback 1316 is received may be a slot n, and the window 1112 may include slots n−1, n−2 . . . to n−$K1_{max}$.

At 1804, the base station may receive a HARQ-ACK bit appended to the feedback, where the HARQ-ACK bit is associated with other DL data, and where the SPS DL data is associated with another cancelled PUCCH transmission. For example, 1804 may also be performed by Type-1 HARQ feedback component 1948. In one example, the other DL data may be SPS DL data. For instance, referring to FIG. 13, the base station 1304 may receive HARQ-ACK for SPS data 1308 received outside the Type-1 HARQ-ACK codebook window appended to the feedback 1316 at 1320. The feedback may be according to a Type 1 HARQ-ACK codebook, and the HARQ-ACK bit appended to the feedback may be according to another codebook based on an SPS PDSCH configuration. For instance, referring to FIG. 11, the base station may receive HARQ-ACK bits generated and placed corresponding to SPS PDSCH occasions 1102 in a Type-1 HARQ codebook as described above with respect to FIGS. 9 and 10, and then HARQ-ACK bits generated for SPS PDSCH occasion 1114 or other SPS PDSCH occasions outside window 1112 according to an SPS configuration-based codebook, such as described above with respect to FIG. 12 (or according to some other codebook or manner). The base station may receive the HARQ-ACK bits for the outside SPS PDSCH occasions appended by the UE to the Type-1 HARQ codebook. Thus, the other SPS DL data associated with the appended HARQ-ACK bit may be, for example, SPS DL data 1308 in SPS PDSCH occasion 1114 or other SPS PDSCH occasions outside window 1112 which are associated with cancelled PUCCH transmissions 1106. In other examples, the other DL data may be dynamically scheduled DL data. For example, the SPS PDSCH occasions referenced in the aforementioned example may be replaced with dynamically scheduled PDSCH occasions and/or a combination of dynamically scheduled and SPS PDSCH occasions, and the other DL data associated with the appended HARQ-ACK bit may be, for example, data 1306 (dynamically scheduled DL data) in PDSCH occasions outside window 1112 which are associated with cancelled PUCCH transmissions 1106.

The feedback may be received in a slot, each of the DL data may be in a window prior to the slot, and the other DL data may be in another slot prior to the window. For example, referring to FIGS. 11 and 13, the base station 1304 may receive feedback 1316 in PUCCH occasion 1110, which is validly scheduled in an uplink slot, and the SPS PDSCH occasions 1102 associated with cancelled PUCCH transmissions 1106 may be within window 1112 of slots spanning a length K1max as described above with respect to FIGS. 9 and 10. For instance, the number of slots $K1_{max}$ may correspond to a maximum value in a set of slot timing values K1, the slot in which the feedback 1316 is reported may be a slot n, and the window 1112 may include slots n−1, n−2 . . . to $n-K1_{max}$. Thus, the SPS PDSCH occasion 1114 outside window 1112 may be in a slot $n-K1_{max}-1$ or earlier. Nevertheless, as the size of window 1112 ($K1_{max}$) can flexibly be any set of configured value(s) (e.g., from 0 to 15 based on base station configured parameter dl-DataToUL-ACK), the UE may effectively append HARQ-bits for any of the configured SPS PDSCH occasions (e.g., SPS PDSCH occasions 1102 or SPS PDSCH occasion 1114) to the Type-1 HARQ codebook.

Figure 19:
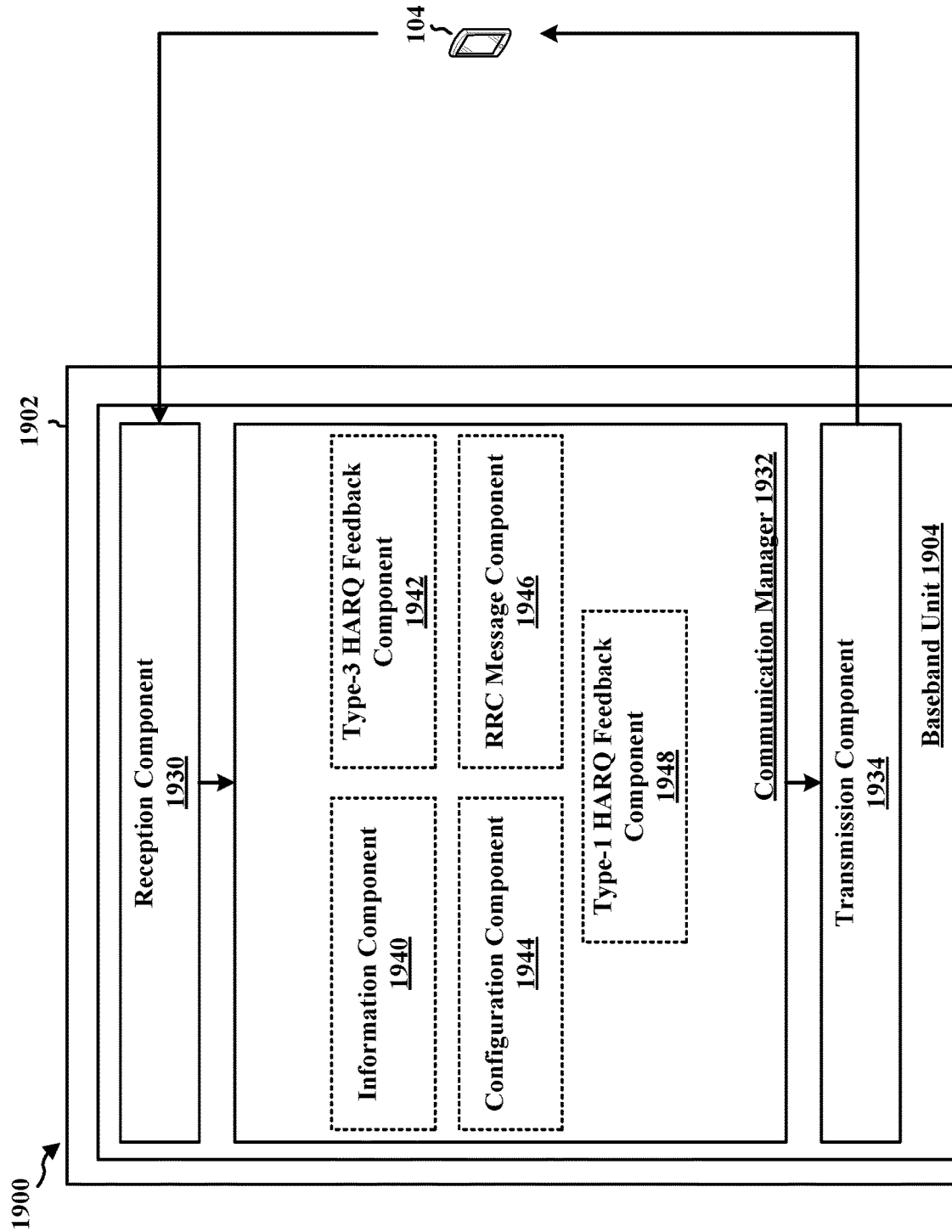
FIG. 19 is a diagram illustrating another example of a hardware implementation for another example apparatus.

FIG. 19 is a diagram 1900 illustrating an example of a hardware implementation for an apparatus 1902. The apparatus 1902 is a BS and includes a baseband unit 1904. The baseband unit 1904 may communicate through a cellular RF transceiver with the UE 104. The baseband unit 1904 may include a computer-readable medium/memory. The baseband unit 1904 is responsible for general processing, including the execution of software stored on the computer-readable medium/memory. The software, when executed by the baseband unit 1904, causes the baseband unit 1904 to perform the various functions described supra. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the BS 310 and may include the memory 376 and/or at least one of the TX processor 316, the RX processor 370, and the controller/processor 375.

The communication manager 1932 includes an information component 1940 that is configured to transmit, to a UE, information triggering feedback for a plurality of DL HARQ processes of the UE, e.g., as described in connection with 1702. The communication manager 1932 further includes a RRC message component 1946 that is configured to transmit, to the UE, a RRC message configuring the feedback to be for less than all of the DL HARQ processes, e.g., as described in connection with 1703. The communication manager 1932 further includes a Type-3 HARQ feedback component 1942 that receives input in the form of information from the components 1940, 1946 and is configured to receive the feedback based at least in part on the information and the RRC message, e.g., as described in connection with 1704. The communication manager 1932 further includes a configuration component 1944 that is configured to configure the information (e.g., DCI) to indicate scheduling information for a DL data transmission, where the feedback is further for a HARQ process associated with the DL data transmission, e.g., as described in connection with 1706.

The communication manager 1932 further includes a Type-1 HARQ feedback component 1948 that is configured to receive feedback including a plurality of HARQ-ACK bits in a PUCCH, wherein each of the HARQ-ACK bits is associated with DL data, and at least one of the DL data is associated with a cancelled PUCCH transmission, e.g., as described in connection with 1802. The Type-1 HARQ feedback component 1948 is further configured to receive a HARQ-ACK bit appended to the feedback, where the HARQ-ACK bit is associated with other DL data, and where the other DL data is associated with another cancelled PUCCH transmission, e.g., as described in connection with 1804.

The apparatus may include additional components that perform each of the blocks of the algorithm in the aforementioned flowcharts of FIGS. 13, 17 and 18. As such, each block in the aforementioned flowcharts of FIGS. 13, 17 and 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the baseband unit 1904, includes means for transmitting, to a UE, information triggering feedback for a plurality of DL HARQ processes of the UE; where the means for transmitting is further configured to transmit, to the UE, a RRC message configuring the feedback to be for less than all of the DL HARQ processes, and means for receiving the feedback based at least in part on the information and the RRC message. In one configuration, the apparatus 1902, and in particular the baseband unit 1904, may include means for configuring the information to indicate scheduling information for a DL data transmission, where the feedback is further for a HARQ process associated with the DL data transmission.

In one configuration, the apparatus 1902, and in particular the baseband unit 1904, includes means for receiving feedback including a plurality of HARQ-ACK bits in a PUCCH, wherein each of the HARQ-ACK bits is associated with DL data, and at least one of the DL data is associated with a cancelled PUCCH transmission. In one configuration, the means for receiving may be further configured to receive a HARQ-ACK bit appended to the feedback, wherein the HARQ-ACK bit is associated with other DL data, and wherein the other DL data is associated with another cancelled PUCCH transmission.

The aforementioned means may be one or more of the aforementioned components of the apparatus 1902 configured to perform the functions recited by the aforementioned means. As described supra, the apparatus 1902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method of wireless communication performed by a UE, comprising: receiving, from a base station, information triggering feedback for a plurality of DL HARQ processes of the UE; receiving, from the base station, a RRC message configuring the feedback to be for less than all of the DL HARQ processes; and reporting the feedback based at least in part on the information and the RRC message.

Example 2 is the method of Example 1, wherein the information comprises DCI, and wherein the DCI comprises a trigger for one-shot feedback reporting according to a Type-3 HARQ-ACK codebook.

Example 3 is the method of Example 2, further comprising: determining whether the DCI includes scheduling information for a DL data transmission, wherein the feedback is further for a HARQ process associated with the DL data transmission.

Example 4 is the method of Example 3, wherein the determination is based at least in part on a resource assignment field of the DCI.

Example 5 is the method of Examples 1 to 4, wherein the information comprises an indication to report the feedback for only the DL HARQ processes associated with SPS data transmissions.

Example 6 is the method of Example 5, wherein the indication includes a bit in DCI, an information field setting in the DCI, a configuration to monitor a SFI, or an uplink transmission priority.

Example 7 is the method of any of Examples 1 to 6, wherein the information comprises an indication to report the feedback for only the DL HARQ processes associated with SPS data transmissions for which a preceding PUCCH transmission was canceled.

Example 8 is the method of Example 7, wherein the indication includes a bit in DCI, an information field setting in the DCI, a configuration to monitor a SFI, or an uplink transmission priority.

Example 9 is the method of any of Examples 1 to 8, wherein the DL HARQ processes are associated with SPS data transmissions, and the feedback includes HARQ payload bits placed in an order of an SPS configuration index for the SPS data transmissions, followed by a HARQ process index for each of the DL HARQ processes, followed by a cell index for a component carrier including the SPS data transmissions associated with the DL HARQ processes.

Example 10 is the method of any of Examples 1 to 8, wherein the DL HARQ processes are associated with SPS data transmissions, and the feedback includes HARQ payload bits placed in an order of an SPS PDSCH occasion associated with a cancelled PUCCH transmission for each of the SPS data transmissions.

Example 11 is the method of any of Examples 1 to 10, wherein the feedback is for a current occasion of a HARQ process for which a preceding HARQ-ACK report on a PUCCH was canceled.

Example 12 is an apparatus for wireless communication, comprising: a memory; and at least one processor coupled to the memory and configured to: receive, from a base station, information triggering feedback for a plurality of DL HARQ processes of the apparatus; receive, from the base station, an RRC message configuring the feedback to be for less than all of the DL HARQ processes; and report the feedback based at least in part on the information and the RRC message.

Example 13 is the apparatus of Example 12, wherein the information comprises DCI, and wherein the DCI comprises a trigger for one-shot feedback reporting according to a Type-3 HARQ-ACK codebook.

Example 14 is the apparatus of Example 13, wherein the at least one processor is further configured to: determine whether the DCI includes scheduling information for a DL data transmission, wherein the feedback is further for a HARQ process associated with the DL data transmission.

Example 15 is the apparatus of Example 14, wherein the determination is based at least in part on a resource assignment field of the DCI.

Example 16 is the apparatus of any of Examples 12 to 15, wherein the information comprises an indication to report the feedback for only the DL HARQ processes associated with SPS data transmissions.

Example 17 is the apparatus of any of Examples 12 to 16, wherein the information comprises an indication to report the feedback for only the DL HARQ processes associated with SPS data transmissions for which a preceding PUCCH transmission was canceled.

Example 18 is the apparatus of any of Examples 12 to 17, wherein the DL HARQ processes are associated with SPS data transmissions, and the feedback includes HARQ payload bits placed in an order of an SPS configuration index for the SPS data transmissions, followed by a HARQ process index for each of the DL HARQ processes, followed by a cell index for a component carrier including the SPS data transmissions associated with the DL HARQ processes.

Example 19 is the apparatus of any of Examples 12 to 17, wherein the DL HARQ processes are associated with SPS data transmissions, and the feedback includes HARQ payload bits placed in an order of an SPS PDSCH occasion associated with a cancelled PUCCH transmission for each of the SPS data transmissions.

Example 20 is the apparatus of any of Examples 12 to 19, wherein the feedback is for a current occasion of a HARQ process for which a preceding HARQ-ACK report on a PUCCH was canceled.

Example 21 is a method of wireless communication performed by a UE, comprising: reporting feedback including a plurality of HARQ-ACK bits in a PUCCH, wherein each of the HARQ-ACK bits is associated with DL data, and at least one of the DL data is associated with a cancelled PUCCH transmission.

Example 22 is the method of Example 21, wherein the DL data is SPS DL data.

Example 23 is the method of Examples 21 or 22, wherein the feedback is reported in a slot, and each of the DL data is in a window prior to the slot.

Example 24 is the method of any of Examples 21 to 23, further comprising: appending to the feedback a HARQ-ACK bit associated with other DL data, wherein the other DL data is associated with another cancelled PUCCH transmission.

Example 25 is the method of Example 24, wherein the other DL data is SPS DL data.

Example 26 is the method of Examples 24 or 25, wherein the feedback is reported in a slot, each of the DL data is in a window prior to the slot, and the other DL data is in another slot prior to the window.

Example 27 is the method of any of Examples 24 to 26, wherein the feedback is according to a Type 1 HARQ-ACK codebook, and wherein the HARQ-ACK bit appended to the feedback is according to another codebook based on an SPS PDSCH configuration.

Example 28 is an apparatus for wireless communication, comprising: a memory; and at least one processor coupled to the memory and configured to: report feedback including a plurality of HARQ-ACK bits in a PUCCH, wherein each of the HARQ-ACK bits is associated with DL data, and at least one of the DL data is associated with a cancelled PUCCH transmission.

Example 29 is the apparatus of Example 28, wherein the at least one processor is further configured to: append to the feedback a HARQ-ACK bit associated with other DL data, wherein the other DL data is associated with another cancelled PUCCH transmission.

Example 30 is the apparatus of Example 29, wherein the feedback is according to a Type 1 hybrid HARQ-ACK codebook, and wherein the HARQ-ACK bit appended to the feedback is according to another codebook based on an SPS PDSCH configuration.

What is claimed is:

1. A method of wireless communication performed by a user equipment (UE), comprising:
   receiving, from a base station, information triggering feedback for a plurality of downlink (DL) hybrid automatic repeat request (HARQ) processes of the UE;
   receiving, from the base station, a radio resource control (RRC) message configuring the feedback to be for less than all of the DL HARQ processes, the information including a modulation and coding scheme (MCS) field further indicating the feedback is to be for the less than all of the DL HARQ processes in response to the information including a one-shot HARQ-ACK request field with a value of 1, a cyclic redundancy check of the information being scrambled by a cell radio network temporary identifier (C-RNTI) of the UE or a MCS-C-RNTI of the UE, and one of:
   a resource allocation in the information being a type 0 resource allocation and a plurality of bits of a frequency domain resource assignment (FDRA) field in the information being equal to 0,
   the resource allocation being a type 1 resource allocation and the plurality of bits of the FDRA field being equal to 1, or
   the resource allocation being a dynamic switch resource allocation and the plurality of bits of the FDRA field being equal to 0 or 1; and
   reporting the feedback based at least in part on the information and the RRC message.

2. The method of claim 1, wherein the information comprises downlink control information (DCI), and wherein the DCI comprises a trigger for one-shot feedback reporting according to a Type-3 HARQ-acknowledgment (ACK) codebook.

3. The method of claim 2, further comprising:
   determining whether the DCI includes scheduling information for a DL data transmission, wherein the feedback is further for a HARQ process associated with the DL data transmission.

4. The method of claim 3, wherein the determination is based at least in part on a resource assignment field of the DCI.

5. The method of claim 1, wherein the information comprises an indication to report the feedback for only the DL HARQ processes associated with semi-persistently scheduled (SPS) data transmissions.

6. The method of claim 5, wherein the indication includes a bit in downlink control information (DCI), an information field setting in the DCI, a configuration to monitor a slot format indication (SFI), or an uplink transmission priority.

7. The method of claim 1, wherein the information comprises an indication to report the feedback for only the DL HARQ processes associated with semi-persistently scheduled (SPS) data transmissions for which a preceding physical uplink control channel (PUCCH) transmission was canceled.

8. The method of claim 7, wherein the indication includes a bit in downlink control information (DCI), an information field setting in the DCI, a configuration to monitor a slot format indication (SFI), or an uplink transmission priority.

9. The method of claim 1, wherein the DL HARQ processes are associated with semi-persistently scheduled (SPS) data transmissions, and the feedback includes HARQ payload bits placed in an order of an SPS configuration index for the SPS data transmissions, followed by a HARQ process index for each of the DL HARQ processes, followed by a cell index for a component carrier including the SPS data transmissions associated with the DL HARQ processes.

10. The method of claim 1, wherein the DL HARQ processes are associated with semi-persistently scheduled (SPS) data transmissions, and the feedback includes HARQ payload bits placed in an order of an SPS physical downlink shared channel (PDSCH) occasion associated with a cancelled physical uplink control channel (PUCCH) transmission for each of the SPS data transmissions.

11. The method of claim 1, wherein the feedback is for a current occasion of a HARQ process for which a preceding HARQ-ACK report on a physical uplink control channel (PUCCH) was canceled.

12. An apparatus for wireless communication, comprising:
a memory; and
at least one processor coupled to the memory and configured to:
receive, from a base station, information triggering feedback for a plurality of downlink (DL) hybrid automatic repeat request (HARQ) processes of the apparatus;
receive, from the base station, an RRC message configuring the feedback to be for less than all of the DL HARQ processes, the information including a modulation and coding scheme (MCS) field further indicating the feedback is to be for the less than all of the DL HARQ processes in response to the information including a one-shot HARQ-ACK request field with a value of 1, a cyclic redundancy check of the information being scrambled by a cell radio network temporary identifier (C-RNTI) of the apparatus or a MCS-C-RNTI of the apparatus, and one of:
a resource allocation in the information being a type 0 resource allocation and a plurality of bits of a frequency domain resource assignment (FDRA) field in the information being equal to 0,
the resource allocation being a type 1 resource allocation and the plurality of bits of the FDRA field being equal to 1, or
the resource allocation being a dynamic switch resource allocation and the plurality of bits of the FDRA field being equal to 0 or 1; and
report the feedback based at least in part on the information and the RRC message.

13. The apparatus of claim 12, wherein the information comprises downlink control information (DCI), and wherein the DCI comprises a trigger for one-shot feedback reporting according to a Type-3 HARQ-acknowledgment (ACK) codebook.

14. The apparatus of claim 13, wherein the at least one processor is further configured to:
determine whether the DCI includes scheduling information for a DL data transmission, wherein the feedback is further for a HARQ process associated with the DL data transmission.

15. The apparatus of claim 14, wherein the determination is based at least in part on a resource assignment field of the DCI.

16. The apparatus of claim 12, wherein the information comprises an indication to report the feedback for only the DL HARQ processes associated with semi-persistently scheduled (SPS) data transmissions.

17. The apparatus of claim 12, wherein the information comprises an indication to report the feedback for only the DL HARQ processes associated with semi-persistently scheduled (SPS) data transmissions for which a preceding physical uplink control channel (PUCCH) transmission was canceled.

18. The apparatus of claim 12, wherein the DL HARQ processes are associated with semi-persistently scheduled (SPS) data transmissions, and the feedback includes HARQ payload bits placed in an order of an SPS configuration index for the SPS data transmissions, followed by a HARQ process index for each of the DL HARQ processes, followed by a cell index for a component carrier including the SPS data transmissions associated with the DL HARQ processes.

19. The apparatus of claim 12, wherein the DL HARQ processes are associated with semi-persistently scheduled (SPS) data transmissions, and the feedback includes HARQ payload bits placed in an order of an SPS physical downlink shared channel (PDSCH) occasion associated with a cancelled physical uplink control channel (PUCCH) transmission for each of the SPS data transmissions.

20. The apparatus of claim 12, wherein the feedback is for a current occasion of a HARQ process for which a preceding HARQ-ACK report on a physical uplink control channel (PUCCH) was canceled.

21. A method of wireless communication performed by a user equipment (UE), comprising:
reporting feedback including a plurality of hybrid automatic repeat request (HARQ)-acknowledgment (ACK) (HARQ-ACK) bits in a physical uplink control channel (PUCCH), the feedback being according to a Type 1 HARQ-ACK codebook, wherein each of the HARQ-ACK bits is associated with downlink (DL) data, and at least one of the DL data is associated with a cancelled PUCCH transmission, the PUCCH transmission being cancelled based on a scheduling of an associated PUCCH occasion in one or more DL symbols; and
appending to the feedback according to the Type 1 HARQ-ACK codebook a HARQ-ACK bit associated with other DL data, wherein the HARQ-ACK bit appended to the feedback according to the Type 1 HARQ-ACK codebook is according to another codebook based on a semi-persistently scheduled (SPS) physical downlink shared channel (PDSCH) configuration.

22. The method of claim 21, wherein the DL data is semi-persistently scheduled (SPS) DL data.

23. The method of claim 21, wherein the feedback is reported in a slot, and each of the DL data is in a window prior to the slot.

24. The method of claim 21, wherein the other DL data is associated with another cancelled PUCCH transmission.

25. The method of claim 24, wherein the other DL data is semi-persistently scheduled (SPS) DL data.

26. The method of claim 24, wherein the feedback is reported in a slot, each of the DL data is in a window prior to the slot, and the other DL data is in another slot prior to the window.

27. An apparatus for wireless communication, comprising:
  a memory; and
  at least one processor coupled to the memory and configured to:
    report feedback including a plurality of hybrid automatic repeat request (HARQ)-acknowledgment (ACK) (HARQ-ACK) bits in a physical uplink control channel (PUCCH), the feedback being according to a Type 1 HARQ-ACK codebook, wherein each of the HARQ-ACK bits is associated with downlink (DL) data, and at least one of the DL data is associated with a cancelled PUCCH transmission, the PUCCH transmission being cancelled based on a scheduling of an associated PUCCH occasion in one or more DL symbols; and
    append to the feedback according to the Type 1 HARQ-ACK codebook a HARQ-ACK bit associated with other DL data, wherein the HARQ-ACK bit appended to the feedback according to the Type 1 HARQ-ACK codebook is according to another codebook based on a semi-persistently scheduled (SPS) physical downlink shared channel (PDSCH) configuration.

28. The apparatus of claim 27, wherein the other DL data is associated with another cancelled PUCCH transmission.

* * * * *